US012675560B1

(12) United States Patent
Dvorachek et al.

(10) Patent No.: US 12,675,560 B1
(45) Date of Patent: Jul. 7, 2026

(54) SYSTEMS AND METHODS FOR IMPROVED HIGH-VOLUME COMPUTER SERVICE ACCESS MANAGEMENT

(71) Applicant: The Travelers Indemnity Company, Hartford, CT (US)

(72) Inventors: Thomas J. Dvorachek, Kensington, CT (US); Anupam K. Sharma, Rocky Hill, CT (US); Eric Nuzzi, Avon, CT (US)

(73) Assignee: The Travelers Indemnity Company, Hartford, CT (US)

( * ) Notice: Subject to any disclaimer, the term of this patent is extended or adjusted under 35 U.S.C. 154(b) by 133 days.

(21) Appl. No.: 18/424,992

(22) Filed: Jan. 29, 2024

(51) Int. Cl.
*G06F 21/31* (2013.01)

(52) U.S. Cl.
CPC .................................... *G06F 21/31* (2013.01)

(58) Field of Classification Search
CPC ......... G06F 21/31; H04L 63/08; H04L 63/20; H04L 63/083; H04L 63/107; H04L 63/853
USPC ........................................................... 726/7
See application file for complete search history.

(56) References Cited

U.S. PATENT DOCUMENTS

| | | | | |
|---|---|---|---|---|
| 12,192,240 | B2 * | 1/2025 | Kondapi ............... | H04L 63/123 |
| 2007/0123253 | A1 * | 5/2007 | Simongini ............ | H04L 67/306 |
| | | | | 455/433 |
| 2014/0189808 | A1 * | 7/2014 | Mahaffey ............ | G06F 21/6245 |
| | | | | 726/4 |
| 2015/0254455 | A1 * | 9/2015 | Sandhu ................... | G06F 9/455 |
| | | | | 726/29 |
| 2018/0300839 | A1 * | 10/2018 | Appu ........................ | G06T 1/60 |
| 2019/0319794 | A1 * | 10/2019 | Haldar .................. | H04L 9/3236 |
| 2019/0386973 | A1 * | 12/2019 | Patwardhan ............ | G06F 21/44 |
| 2021/0021570 | A1 * | 1/2021 | Shribman ............... | H04L 67/02 |
| 2021/0075587 | A1 * | 3/2021 | Alwen .................. | H04L 9/0891 |
| 2021/0336959 | A1 * | 10/2021 | Shah ................... | H04L 63/0281 |
| 2021/0377210 | A1 * | 12/2021 | Singh ...................... | G06F 21/44 |
| 2022/0255902 | A1 * | 8/2022 | Woodson .............. | H04L 63/029 |
| 2024/0223579 | A1 * | 7/2024 | Sundararajan .......... | H04L 63/20 |
| 2024/0283784 | A1 * | 8/2024 | McCormick ........ | G06F 21/6218 |

OTHER PUBLICATIONS

Website: SiteMinder https://www.broadcom.com/products/identity/siteminder#solution-overview ; Download date: Apr. 2, 2024; 6 pps.

* cited by examiner

*Primary Examiner* — James N Fiorillo
(74) *Attorney, Agent, or Firm* — RowanTree Law Group, PLLC; Carson C.K.. Fincham

(57) ABSTRACT

Systems, apparatus, methods, and articles of manufacture for improved high-volume computer service access management, such as a computerized environment that executes a specially-programmed interception application that evaluates service requests prior to forwarding such requests to a designated service or application.

19 Claims, 11 Drawing Sheets

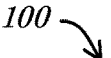

```
┌──────────┐   ┌──────────┐         ┌──────────┐
│  SOURCE  │   │  SOURCE  │  • • •   │  SOURCE  │
│  DEVICE  │   │  DEVICE  │         │  DEVICE  │
│   102a   │   │   102b   │         │   102n   │
└──────────┘   └──────────┘         └──────────┘

┌──────────┐   ┌──────────┐
              ☁ NETWORK              ┌────────┐│  SERVER  │   │   140    │
                  104                │        ││  DEVICE  │   │  MEMORY  │
                                     └────────┘│   110    │   │  DEVICE  │
                                              └──────────┘   └──────────┘

┌──────────┐   ┌──────────┐         ┌──────────┐
│  TARGET  │   │  TARGET  │  • • •   │  TARGET  │
│  DEVICE  │   │  DEVICE  │         │  DEVICE  │
│   106a   │   │   106b   │         │   106n   │
└──────────┘   └──────────┘         └──────────┘
```

*FIG. 1*

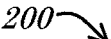
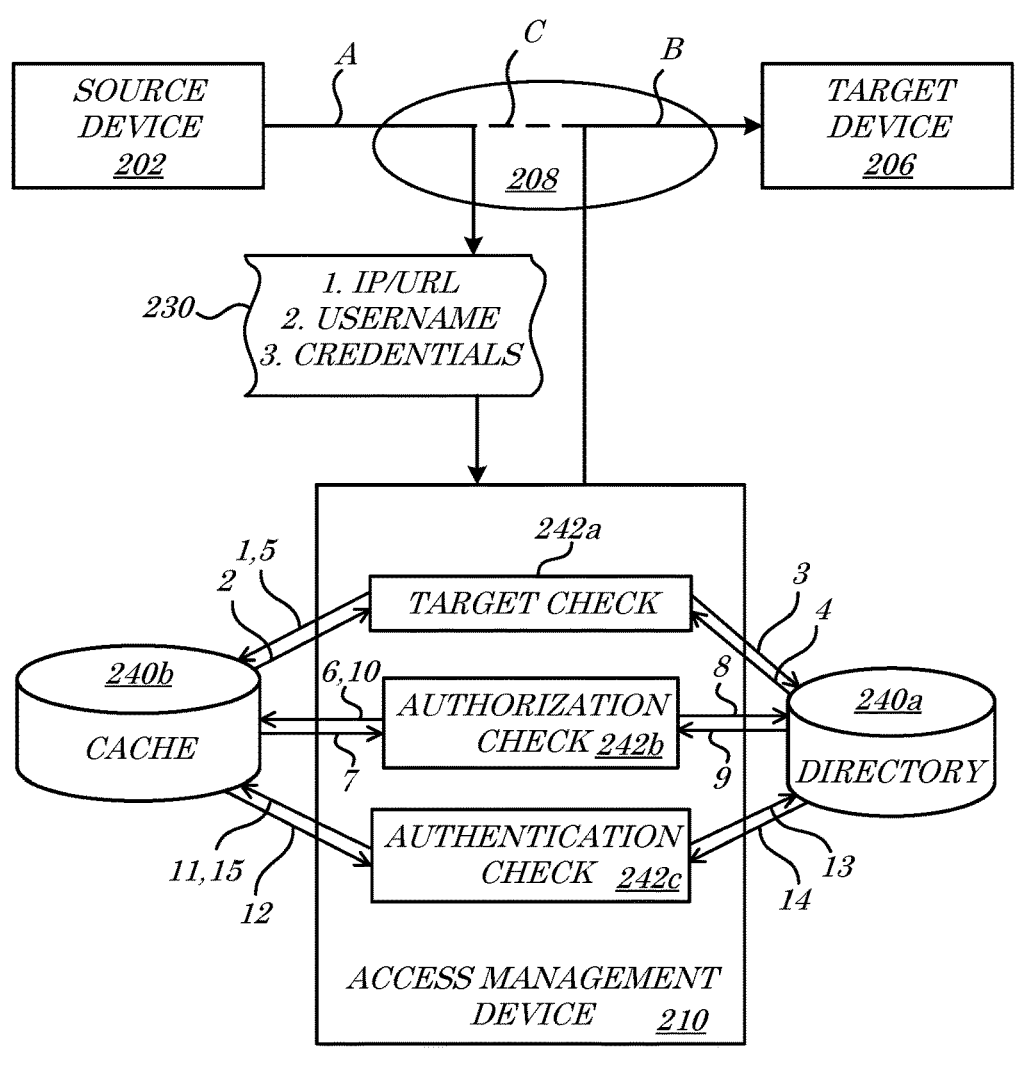
*FIG. 2*

300

SECURE ENVIRONMENT
300-1

USER
DEVICE
302

A

SERVICE ENVIRONMENT
300-2

CONTAINER     308

340a

CACHE

ACCESS
SIDECAR 310

B

SERVICE
306

C

CLOUD ENVIRONMENT
300-3

340b

ACTIVE
DIRECTORY

400

| 402 | 410 | 440a | 440b | 406 |
|---|---|---|---|---|
| USER DEVICE | ACCESS DEVICE | CACHE | DIRECTORY | SERVICE DEVICE |

INPUT / REQUEST

① SET

② NAME

③ ④ ⑤ EXISTS?

⑥ ⑦

⑧ ⑨ EXISTS?

(10a)

⑩b ⑪

⑫

⑬ ⑭

⑮ ⑯ GROUP?

⑰ ⑱

(19a)

⑲b ⑳

㉑

㉒ ㉓

㉔ ㉕ CREDS?

㉖ ㉗

(28a)

㉘b ㉙

㉚

㉛ ㉜

㉝

OUTPUT

EXECUTE

Figure 5A:
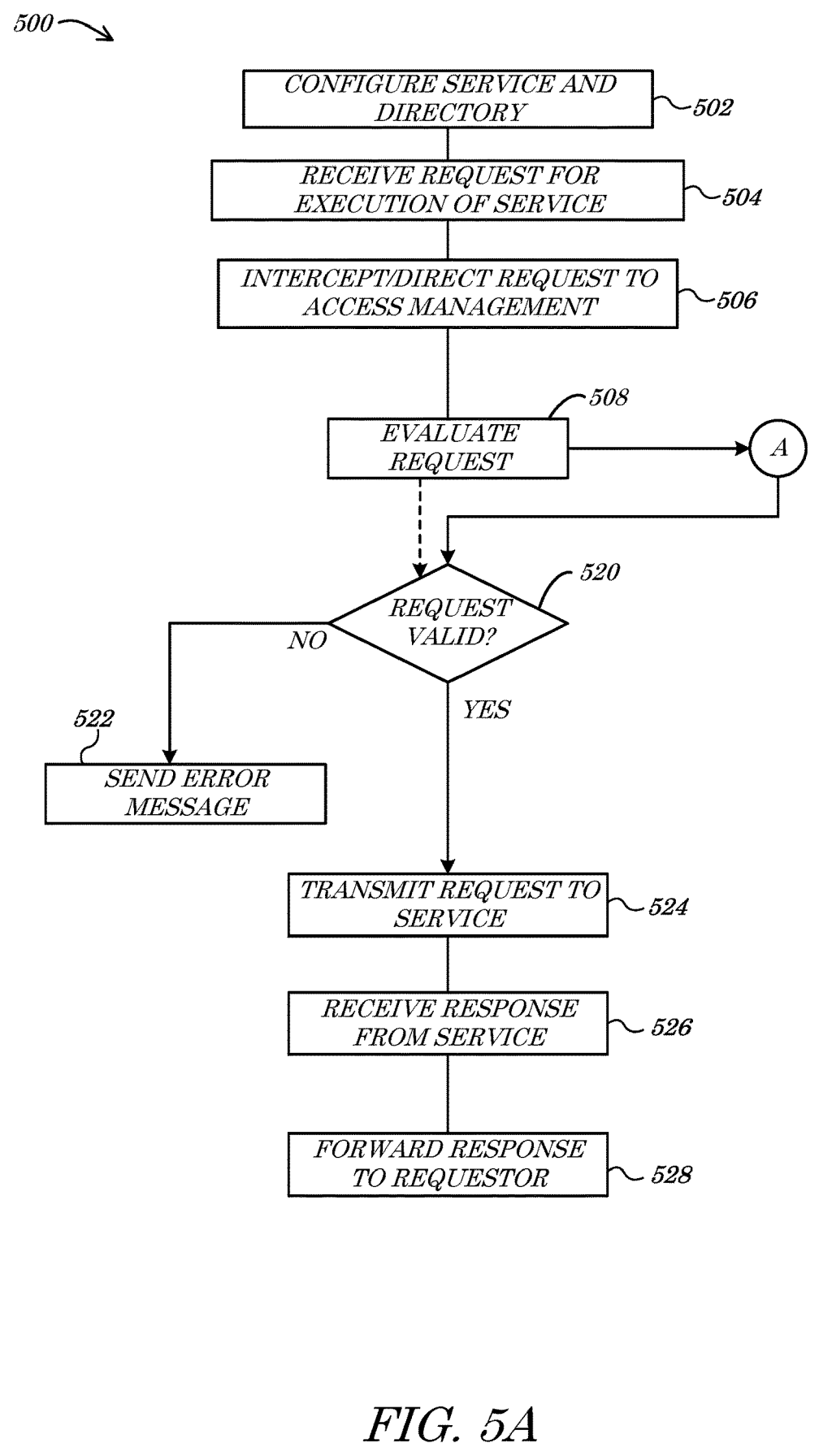

500 —➘

```
┌─────────────────────────┐
│  CONFIGURE SERVICE AND  │ ~502
│       DIRECTORY         │
└─────────────────────────┘
            │
┌─────────────────────────┐
│   RECEIVE REQUEST FOR   │ ~504
│   EXECUTION OF SERVICE  │
└─────────────────────────┘
            │
┌─────────────────────────┐
│ INTERCEPT/DIRECT REQUEST TO │ ~506
│   ACCESS MANAGEMENT     │
└─────────────────────────┘
            │
                          ~508
┌──────────────┐
│   EVALUATE   │ ─────────────► ( A )
│   REQUEST    │
└──────────────┘
       ╎                │
       ╎                │
       ▼                ▼
        ◇ REQUEST ◇   ~520
   NO  ◇  VALID?  ◇
  ◄────◇         ◇
        ◇       ◇
            │ YES
```

522

┌──────────────────┐
│  SEND ERROR      │
│  MESSAGE         │
└──────────────────┘

┌──────────────────────────┐
│  TRANSMIT REQUEST TO     │ ~524
│       SERVICE            │
└──────────────────────────┘
            │
┌──────────────────────────┐
│   RECEIVE RESPONSE       │ ~526
│   FROM SERVICE           │
└──────────────────────────┘
            │
┌──────────────────────────┐
│  FORWARD RESPONSE        │ ~528
│   TO REQUESTOR           │
└──────────────────────────┘

ACCESS MANAGEMENT MODULE

740d

740e

SYSTEMS AND METHODS FOR IMPROVED HIGH-VOLUME COMPUTER SERVICE ACCESS MANAGEMENT

BACKGROUND

Enterprise-level access management platforms, such as Symantec® SiteMinder available from Broadcom® Inc. of San Jose, CA, offer various computer-environment management capabilities, such as basic authentication, Single Sign-On (SSO), and real-time security. Such conventional systems, however, are likely to suffer from reduced performance or even outright failure when attempting to process transactions in a high-volume environment. Accordingly, systems and methods that provide for improved high-volume access management in computer environments are desired.

BRIEF DESCRIPTION OF THE DRAWINGS

The figures depict embodiments for purposes of illustration only. One skilled in the art will readily recognize from the following description that alternative embodiments of the systems and methods illustrated herein may be employed without departing from the principles described herein, wherein:

FIG. 1 is a block diagram of a system according to some embodiments;

FIG. 2 is a block diagram of a system according to some embodiments;

FIG. 5A and FIG. 5B are flow diagrams of a method according to some embodiments;

DETAILED DESCRIPTION

I. Introduction

Figure 3:
FIG. 3 is a block diagram of a system according to some embodiments.

Traditional enterprise-level access management platforms are configured to provide a suite of services and functionality, including basic authentication. Such platforms however, often suffer from performance issues in certain use-cases, such as when exposed to high-volume basic authentication transactional environments. "High-volume" generally describes a number of transactions (e.g., basic authentication requests) that exceeds one hundred to one thousand transactions per minute or more than one million transactions per day. In such environments, typical platforms experience significant processing delays and/or failures (e.g., dropped transactions). Such systems accordingly may work well for certain environments, such as where only user authentication is required, but suffer serious deficiencies, for example, in environments that include thousands of applications or services that require service-to-service authentication.

In accordance with embodiments herein, these and other deficiencies of existing systems are remedied by providing systems, apparatus, methods, and articles of manufacture for improved high-volume computer service access management. In some embodiments, for example, a specially-programmed interception application may be utilized to evaluate service requests prior to forwarding such requests to a designated service or application. In some embodiments, caching may be leveraged to reduce the number of queries sent to an Active Directory (AD). According to some embodiments, the system may be programmed to: (i) standardize service naming, (ii) standardize authorization group definitions, (iii) intercept authentication requests (e.g., user-to-service and/or service-to-service), (iv) evaluate authentication requests, (v) cache request and/or validation data, (vi) prevent unsuccessful requests from reaching the target and/or providing an error message for unsuccessful requests, and/or (vii) forward successful requests on to the target, all as described herein. In such a manner, for example, the improved high-volume computer service access management system may function as gatekeeper for authentication requests, reducing unnecessary AD request volume and providing efficient basic authentication for the computer service environment.

II. Improved High-Volume Computer Service Access Management Systems

Referring first to FIG. 1, a block diagram of a system 100 according to some embodiments is shown. In some embodiments, the system 100 may comprise a plurality of source devices 102a-n, a network 104, a plurality of target devices 106a-n, and/or a server device 110. According to some embodiments, any or all of the components 102a-n, 104, 106a-n, 110 may comprise and/or be in communication with a data storage and/or memory device 140. The server device 110 may comprise and/or be in direct communication with the memory device 140, for example, and/or the source devices 102a-n and/or the target devices 106a-n may be in communication with the memory device 140 via the network 104. As depicted in FIG. 1, any or all of the components 102a-n, 106a-n, 110, 140 (or any combinations thereof) may be in communication via the network 104. In some embodiments, communications between and/or within the components 102a-n, 106a-n, 110, 140 of the system 100 may be utilized to provide an improved high-volume computer service access management platform. The server device 110 may, for example, interface with one or more of the source devices 102a-n by, e.g., intercepting a request sent to one or more of the target devices 106a-n, validating the request (e.g., utilizing data stored in the memory device 140), and/or forwarding a validated request on to one or more of the target devices 106a-n.

Fewer or more components 102a-n, 104, 106a-n, 110, 140 and/or various configurations of the depicted components 102a-n, 104, 106a-n, 110, 140 may be included in the system 100 without deviating from the scope of embodiments described herein. In some embodiments, the components 102a-n, 104, 106a-n, 110, 140 may be similar in configuration and/or functionality to similarly named and/or numbered components as described herein. In some embodiments, the system 100 (and/or portions thereof) may comprise an improved high-volume computer service access management program, system, and/or platform programmed and/or otherwise configured to execute, conduct, and/or facilitate the methods/algorithms 400, 500, 800 of FIG. 4, FIG. 5A, FIG. 5B, and/or FIG. 8 herein, and/or portions or combinations thereof.

The source devices 102a-n, in some embodiments, may comprise any types or configurations of computing, mobile electronic, network, user, and/or communication devices that are or become known or practicable. The source devices 102a-n may, for example, comprise one or more Personal Computer (PC) devices, computer workstations (e.g., an enterprise employee workstation), tablet computers, such as an iPad® manufactured by Apple®, Inc. of Cupertino, CA, and/or cellular and/or wireless telephones, such as an iPhone® (also manufactured by Apple®, Inc.) or an LG Optimus™ Zone™ 3 smart phone manufactured by LG® Electronics, Inc. of San Diego, CA, and running the Android® operating system from Google®, Inc. of Mountain View, CA. In some embodiments, the source devices 102a-n may comprise devices owned and/or operated by one or more users, such as insurance agents, underwriters, account managers, brokers, customer service representatives, Information Technology (IT) programmers, employees, and/or consultants or service providers. According to some embodiments, the source devices 102a-n may communicate with the server device 110 directly and/or via the network 104 (as depicted) to provide access requests to utilize (e.g., call and/or invoke) one or more services provided by one or more of the target devices 106a-n. According to some embodiments, any of the source devices 102a-n may communicate with the target devices 106a-n through and/or via the server device 110. The server device 110 may, for example, execute specially-programmed instructions (not separately shown) stored in the memory device 140 to manage communications (e.g., communication sessions, requests, data transmissions, and/or data inputs and/or data outputs) between one or more of the source devices 102a-n and one or more of the target devices 106a-n (e.g., which may provide a desired/called service). In some embodiments, the source devices 102a-n may interface with the server device 110 to effectuate communications (direct or indirect) with one or more other source devices 102a-n (such communication not explicitly shown in FIG. 1) operated by other users. While the source devices 102a-n are generally referred to as a class or type of user device for convenience herein and are accordingly operated and/or owned by a "user", in some embodiments the "user" may comprise not only an individual/person/employee, but also or alternatively a computerized "user", such as an application, an Application Programming Interface (API), and/or a service. In other words, a first source device 102a may comprise a first service and/or first device associated therewith and/or a second source device 102b may comprise a second service and/or second device associated therewith.

The network 104 may, according to some embodiments, comprise a Local Area Network (LAN; wireless and/or wired), cellular telephone, Bluetooth®, Near Field Communication (NFC), and/or Radio Frequency (RF) network with communication links between the server device 110, the source devices 102a-n, the target devices 106a-n, and/or the memory device 140. In some embodiments, the network 104 may comprise direct communication links between any or all of the components 102a-n, 106a-n, 110, 140 of the system 100. The source devices 102a-n may, for example, be directly interfaced or connected to the server device 110 and/or the memory device 140 via one or more wires, cables, wireless links, and/or other network components, such network components (e.g., communication links) comprising portions of the network 104. In some embodiments, the network 104 may comprise one or many other links or network components other than (in addition to or in place of) those depicted in FIG. 1. The server device 110 may, for example, be connected to the target devices 106a-n and/or the source devices 102a-n via various cell towers, routers, repeaters, ports, switches, and/or other network components that comprise the Internet and/or a cellular telephone (and/or Public Switched Telephone Network (PSTN)) network, and which comprise portions of the network 104.

While the network 104 is depicted in FIG. 1 as a single object, the network 104 may comprise any number, type, and/or configuration of networks that is or becomes known or practicable. According to some embodiments, the network 104 may comprise a conglomeration of different sub-networks and/or network components interconnected, directly or indirectly, by the components 102a-n, 106a-n, 110, 140 of the system 100. The network 104 may comprise one or more cellular telephone networks with communication links between the source devices 102a-n and the server device 110, for example, and/or may comprise an Internet Protocol (IP) network with communication links between the server device 110 and the target devices 106a-n and/or the memory device 140, for example.

The target devices 106a-n, in some embodiments, may comprise any type or configuration of a computerized processing device, such as a PC, laptop computer, computer server, database system, and/or other electronic device, devices, or any combination thereof. In some embodiments, the target devices 106a-n may be owned and/or operated by a third-party (i.e., an entity different than any entity owning and/or operating either the source devices 102a-n or the server device 110; such as a third-party service provider). The target devices 106a-n may, for example, execute and/or provide one or more web services, API instances, and/or applications that provide various data processing and/or computational results (e.g., outputs). According to some embodiments, the target devices 106a-n may comprise a plurality of devices and/or may be associated with a plurality of third-party entities and/or services. While the target devices 106a-n are generally referred to as a class or type of user device for convenience herein and are accordingly operated and/or owned by a "user", in some embodiments the "user" may comprise not only an individual/person/employee, but also or alternatively a computerized "user", such as an application, API, and/or a service. In other words, a first target device 106a may comprise a first service and/or first device associated therewith and/or a second target device 106b may comprise a second service and/or second device associated therewith.

In some embodiments, the server device 110 may comprise an electronic and/or computerized controller device, such as a computer server communicatively coupled to interface with the source devices 102a-n and/or the target devices 106a-n (directly and/or indirectly). The server device 110 may, for example, comprise one or more PowerEdge™ R830 rack servers manufactured by Dell®, Inc. of Round Rock, TX, which may include one or more Twelve-Core Intel® Xeon® E5-4640 v4 electronic processing devices. In some embodiments, the server device 110 may comprise a plurality of processing devices specially-programmed to execute and/or conduct processes that are not practicable without the aid of the server device 110. The server device 110 may, for example, intercept and evaluate requests sent from source devices 102a-n to target devices 106a-n in a manner that provides improved efficiency, less latency, and reduces processing requirements, which would not be capable of being conducted without the benefit of the specially-programmed server device 110. According to some embodiments, the server device 110 may be located remotely from one or more of the source devices 102a-n and/or the target devices 106a-n. The server device 110 may also or alternatively comprise a plurality of electronic processing devices located at one or more various sites and/or locations (e.g., distributed and/or virtual computing).

According to some embodiments, the server device 110 may store and/or execute specially programmed instructions to operate in accordance with embodiments described herein. The server device 110 may, for example, execute one or more models (e.g., Artificial Intelligence (AI) and/or mathematical models), algorithms, programs, modules, and/or routines that facilitate improved high-volume computer service access management, as described herein. According to some embodiments, the server device 110 may comprise a computerized processing device, such as a computer server and/or other electronic device, to manage and/or facilitate transactions, transmissions, and/or communications between the source devices 102a-n and the target devices 106a-n. An enterprise user, corporate employee, agent, claim handler, underwriter, first service, computer client, and/or other user may, for example, utilize the server device 110 to (i) prepare, define, and/or send a request (e.g., a request for a service/second service) to the server device 110, (ii) have the request automatically evaluated (e.g., for applicability, authorization, and/or authentication), (iii) have the request automatically forwarded to a desired/designated target device 106a-n, (iv) have the request automatically rejected in the case the evaluation fails, and/or (v) have the request (and/or information associated therewith) stored in cache memory (not separately shown; e.g., the memory device 140).

In some embodiments, the source devices 102a-n, the target devices 106a-n, and/or the server device 110 may be in communication with the memory device 140. The memory device 140 may comprise, for example, various databases and/or data storage mediums that may store, for example, data descriptive of the source devices 102a-n, data descriptive of the target devices 106a-n, an AD (and/or other directory), user preference and/or characteristics data, historic user/service data, service requests (e.g., inputs), service response data (e.g., outputs), geolocation data, AI models, chain code instructions, blockchain data, cryptographic keys and/or data, login and/or identity credentials, group and/or authorization data, and/or instructions that cause various devices (e.g., the server device 110) to operate in accordance with embodiments described herein.

The memory device 140 may store, for example, service request intercept instructions and/or models, chain code instructions, and/or data that causes communications between the source devices 102a-n and the target devices 106a-n to be selectively approved, authorized, authenticated, and/or otherwise validated and/or evaluated, e.g., utilizing and/or accessing AD data (stored in the memory device 140 and/or elsewhere). In some embodiments, the memory device 140 may comprise any type, configuration, and/or quantity of data storage devices that are or become known or practicable. The memory device 140 may, for example, comprise an array of optical and/or solid-state hard drives configured to store request data provided by (and/or requested by) the source devices 102a-n, cybersecurity analysis data (e.g., historical data, analysis formulas, and/or mathematical models), and/or various operating instructions, drivers, etc. While the memory device 140 is depicted as a stand-alone component disembodied from (but in communication with) the various source devices 102a-n, the target devices 106a-n, and the server device 110, the memory device 140 may comprise multiple components and/or may be part of any or all of the source devices 102a-n, the target devices 106a-n, and the server device 110. In some embodiments, multi-component memory devices 140 may be distributed across various devices and/or may comprise remotely dispersed components. Any or all of the source devices 102a-n, the target devices 106a-n, and the server device 110 may comprise the memory device 140 or a portion thereof, for example.

Turning now to FIG. 2, a block diagram of a system 200 according to some embodiments is shown. In some embodiments, the system 200 may comprise a source device 202, a target device 206, a routing device 208, and/or an access management device 210. According to some embodiments, the source device 202 may be utilized to generate, define, transmit, and/or provide a call or request 230 to the target device 206. According to some embodiments, the request 230 may be intercepted and/or directed by the routing device 208 to the access management device 210, e.g., via a first path "A". In some embodiments, the access management device 210 may evaluate the request 230 and in the case that the request 230 is determined to be valid, the access management device 210 may pass, release, and/or forward the request 230 to the target device 206, e.g., via a second path "B". According to some embodiments, such as in the case that the routing device 208 intercepts the request 230, the first and/or second paths "A", "B" may deviate from an original desired and/or default path (e.g., a third path) "C" between the source device 202 and the target device 206. In some embodiments, the routing device 208 may comprise a remote or native service that permits communications to be specifically directed, such as a routing service provided by Pivotal Cloud Foundry (PCF) available from Cloud Foundry of The Linux Foundation® of San Francisco, CA, and/or as provided and/or defined by The Open Connectivity Foundation (OCF) industry group (https://openconnectivity.org).

According to some embodiments, the access management device 210 may be in communication with and/or comprise one or more memory devices 240a-b, such as a first memory or directory 240a and/or a second memory or cache 240b. In some embodiments, either or both of the memory devices 240a-b may be implemented and/or defined by an object data store and/or other data storage technique and/or service, such as utilizing the Amazon® Simple Storage Service (Amazon® S3™) available from Amazon.com, Inc. of Seattle, WA, or an open-source third-party database service, such as MongoDB™ available from MongoDB, Inc. of New York, NY. In some embodiments, the directory 240a may store (not separately shown) various data records, such as, but not limited to, a service and/or device registry, authorization data (e.g., security and/or access groups and/or privileges), and/or authentication data (e.g., access credentials). According to some embodiments, although depicted in FIG. 2 for ease of reference as a single device, the directory 240a may comprise a plurality of local, remote, third-party, and/or distributed data stores, tables, listings, databases, and/or directory types (e.g., an AD and/or an AD configured utilizing the Lightweight Directory Services (LDS) protocol, data store, and/or service).

In some embodiments, the access management device 210 may define, store, and/or comprise instructions, algorithms, models, and/or code 242a-c that are, e.g., executable by the access management device 210. According to some embodiments, the code 242a-c may be executable in response to a receipt and/or identification of the request 230. The routing device 208 may, for example, listen for, identify, intercept, and/or route the request 230 to the access management device 210. The routing device 208 and/or the request 230 may, in some embodiments, trigger and/or initiate the access management device 210 to evaluate the request 230. In some embodiments, the code 242*a-c* may comprise instructions and/or algorithms that perform: (i) a target check 242*a*, (ii) an authorization check 242*b*, and/or (iii) an authentication check 242*c*. According to some embodiments, as depicted in FIG. 2, the target check 242*a* may query, via a first path "1", the cache 240*b*. The target check 242*a* may, for example, utilize one or more of an Internet Protocol (IP) address ("IP") and/or a Uniform Resource Locator (URL) and/or a user name, each from the request 230, to identify any matching records within the cache 240*b*. In some embodiments, a name of the target device 206 (and/or service thereof) may be set to a particular IP/URL (and/or other network or computer system location identifier). In such a manner, for example, the IP/URL of the request 230 may function as both a location/routing data element, as well as an object (e.g., service, device, and/or resource) identifier.

According to some embodiments, the query results may be returned via a second path "2" to the target check 242*a* and the target check 242*a* may determine/identify from the results whether the IP/URL and/or user name are stored in the cache 240*b*. The IP/URL and/or user name may be stored in the cache 240*b*, for example, in the case that a previous request 230 from the same source device 202 and/or directed to the same target device 206 has recently been received and/or evaluated. In some embodiments, such as in the case that the IP/URL and/or user name are identified in the cache 240*b*, previous validation results may be pulled from the cache 240*b*, e.g., as opposed to being derived again anew. In some embodiments, such as in the case that the IP/URL and/or the user name are not identified in the cache 240*b* (or are not identified as being stored together), the target check 242*a* may query, via a third path "3", the directory 240*a*. The query to the directory 240*a* may, for example, utilize the IP/URL to determine whether the target device 206 (and/or service thereof) constitutes a valid destination, device, service, and/or resource. According to some embodiments, the query results may be returned via a fourth path "4" to the target check 242*a* and the target check 242*a* may determine/identify from the results whether the IP/URL and/or user name are stored in the directory 240*a*. In some embodiments, in the case that the target check 242*a* fails to validate the identity of the target device 206 (and/or service thereof being called by the request 230), the target check 242*a* (and/or the access management device 210) may identify a validation failure and (i) the request 230 may be prevented from being passed forward to the target device 206 and/or (ii) a validation error message may be provided back to the source device 202. According to some embodiments, the target check 242*a* may store, via a fifth path "5", an indication of either a validation success or failure, e.g., in association with the IP/URL and/or user name, in the cache 240*b*.

In some embodiments, such as in the case that the target check 242*a* verifies that the target device 206 (and/or service thereof) is valid, the access management device 210 may invoke and/or initiate the authorization check 242*b*. According to some embodiments, as depicted in FIG. 2, the authorization check 242*b* may query, via a sixth path "6", the cache 240*b*. The authorization check 242*b* may, for example, utilize one or more of the IP/URL and the user name to identify any matching records within the cache 240*b*. In some embodiments, the query results may be returned via a seventh path "7" to the authorization check 242*b* and the authorization check 242*b* may determine/identify from the results whether the user name is stored in the cache 240*b* in association with the IP/URL. In the case that the user name is found to be stored in association with the IP/URL, it may be determined from the query results whether the user name is authorized to access the IP/URL (e.g., whether the user name is a member of a group associated with the IP/URL). In some embodiments, such as in the case that the IP/URL and the user name are not identified together in the cache 240*b* (or the user name is not identified as being authorized to access the IP/URL), the authorization check 242*b* may query, via an eighth path "8", the directory 240*a*. The query to the directory 240*a* may, for example, utilize the IP/URL and the user name to determine whether the source device 202 (and/or user or service thereof) is authorized to access the target device 206 (and/or service thereof). According to some embodiments, the query results may be returned via a ninth path "9" to the authorization check 242*b* and the authorization check 242*b* may determine/identify from the results whether the user name is stored in the directory 240*a* in association with an access group for the target device 206 (and/or IP/URL thereof). In some embodiments, in the case that the authorization check 242*b* fails to validate that the user name is authorized, the authorization check 242*b* (and/or the access management device 210) may identify a validation failure and (i) the request 230 may be prevented from being passed forward to the target device 206 and/or (ii) a validation error message may be provided back to the source device 202. According to some embodiments, the authorization check 242*b* may store, via a tenth path "10", an indication of either a validation success or failure, e.g., in association with the IP/URL and user name, in the cache 240*b*.

According to some embodiments, such as in the case that the authorization check 242*b* verifies that the source device 202 is authorized to access the target device 206 (and/or service thereof), the access management device 210 may invoke and/or initiate the authentication check 242*c*. According to some embodiments, as depicted in FIG. 2, the authentication check 242*c* may query, via an eleventh path "11", the cache 240*b*. The authentication check 242*c* may, for example, utilize the user name and a password (from the request 230) to identify any matching records within the cache 240*b*. In some embodiments, the query results may be returned via a twelfth path "12" to the authentication check 242*c* and the authentication check 242*c* may determine/identify from the results whether the user name and password combination (i.e., credentials) are stored in the cache 240*b* and indicated as valid. In the case that the credentials are found to be stored in in the cache 240*b*, it may be determined from the query results whether the credentials have already been determined to be valid. In some embodiments, such as in the case that the user name and password are not identified together in the cache 240*b* (or the credentials are not identified as being valid), the authentication check 242*c* may query, via a thirteenth path "13", the directory 240*a*. The query to the directory 240*a* may, for example, utilize the user name and password to determine whether the credentials supplied by the source device 202 (e.g., as part of the request 230) are valid, and/or are valid for obtaining access to the target device 206 (and/or service thereof). According to some embodiments, the query results may be returned via a fourteenth path "14" to the authentication check 242*c* and the authentication check 242*c* may determine/identify from the results whether the credentials are valid. In some embodiments, in the case that the authentication check 242*c* fails to validate/authenticate the credentials, the authentication check 242*c* (and/or the access management device 210) may identify a validation failure and (i) the request 230 may be prevented from being passed forward to the target device 206 and/or (ii) a validation error message may be provided back to the source device 202. According to some embodiments, the authentication check 242c may store, via a fifteenth path "15", an indication of either a validation success or failure, e.g., in association with the credentials, in the cache 240b.

While both the source device 202 and the target device 206 are generally referred to as "devices" for ease of reference, in some embodiments the source device 202 and/or the target device 206 may comprise network devices and/or resources, such as applications, API instances, and/or services. Although the request 230 is depicted for ease of reference as including (1) an IP/URL, (2) a user name, and (3) credentials, it should be understood that the request may also or alternatively define, include, and/or comprise other data, such as, e.g., data and/or parameter values associated with operation of the target device 206 (and/or service(s) thereof). According to some embodiments, the IP/URL, user name, and/or credentials may reside in a particular portion (not separately identified) of the request 230, such as in a header and/or metadata thereof. In some embodiments, the system 200 may comprise a high-volume transaction system where, e.g., a plurality of source devices 202 generate thousands of requests 230 per hour and/or millions of requests 230 per day. According to some embodiments, the system 200 may comprise many thousands of source devices 202 and/or many thousands of target devices 206, and/or may be configured and/or provided via a Platform-as-a-Service (PaaS) model and/or architecture.

Fewer or more components 202, 206, 208, 210, 240a-b, 242a-c and/or various configurations of the depicted components 202, 206, 208, 210, 240a-b, 242a-c may be included in the system 200 without deviating from the scope of embodiments described herein. In some embodiments, the components 202, 206, 208, 210, 240a-b, 242a-c may be similar in configuration and/or functionality to similarly named and/or numbered components as described herein. In some embodiments, the system 200 (and/or portions thereof) may comprise an improved high-volume computer service access management program, system, and/or platform programmed and/or otherwise configured to execute, conduct, and/or facilitate the methods/algorithms 400, 500, 800 of FIG. 4, FIG. 5A, FIG. 5B, and/or FIG. 8 herein, and/or portions or combinations thereof.

Referring now to FIG. 3, a block diagram of a system 300 according to some embodiments is shown. In some embodiments, the system 300 may comprise a multi-segment computer environment that comprises and/or defines a first or secure environment 300-1, a second or service environment 300-2, and/or a third or cloud environment 300-3. In some embodiments, the system 300 and/or one or more of the environments 300-1, 300-2, 300-3 may be implemented and/or configured as one or more Kubernetes clusters, such as via the Amazon® Web Services (AWS) Elastic Kubernetes Service (EKS) available from Amazon.com, Inc. of Bellevue, WA. According to some embodiments, the system 300 and/or the secure environment 300-1 may comprise a user device 302 that transmits requests (not separately shown) to the service environment 300-2, e.g., to activate, invoke, call, and/or execute a service 306 thereof. According to some embodiments, the service environment 300-2 (and/or the system 300) may define and/or comprise a "pod" or container 308 within which both the service 306 and an access sidecar 310 are disposed and/or encapsulated. The container 308 may define how the service 306 and the access sidecar 310 operate, for example, such that the container 308 acts as (and/or comprises) a router that directs incoming requests from the user device 302 to the access sidecar 310 via a first path "A" and, in the case that a request is validated by the access sidecar 310, onward to the service 306 via a second path "B". In some embodiments, this routing (and/or interception) may occur despite the request being addressed directly to the service 306 which would otherwise (absent the access sidecar 310) proceed directly to the service 306 via a third or reference path "C".

In some embodiments, the system 300 may comprise one or more data storage devices 340a-b. The service environment 300-2 (and/or the container 308) may comprise, for example, a first memory device or cache 340a that is in communication with (and/or accessible to) the access sidecar 310. The cache 340a may be utilized by the access sidecar 310, in some embodiments, to store indications of received requests (e.g., inputs), request data, such as user names, IP/URL identifiers (and/or other path, location, and/or object identifiers), passwords/credentials, and/or request characteristics (e.g., source identifier, timestamps, etc.), validation determinations, statistics and/or metrics (e.g., number of requests, number of requests per unit of time, number of failed requests, number of failed requests per unit of time, etc.). According to some embodiments, the access sidecar 310 may query the cache 340a to evaluate incoming requests from the user device 302. In the case that an evaluation (e.g., a determination of an authorization and/or authentication) has recently been evaluated for the same user device 302, user (not shown), and/or request, for example, the processing and bandwidth requirement of the system 300 (and/or of the service environment 300-2) may be reduced by utilizing predetermined validation data stored in the cache 340a.

According to some embodiments, such as in the case that validation data is not found in the cache 340a, the access sidecar 310 may query a second memory or AD 340b to evaluate incoming requests. The AD 340b may store, for example, data descriptive of the service 306, one or more access and/or security groups for the service 306, and/or credentials for accessing the service 306. In some embodiments, the access sidecar 310 may query the AD 340b to compare request data to stored data and determine whether the request (or portions thereof) is valid (e.g., matches stored data). In some embodiments, communications between the service environment 300-2 and the cloud environment 300-3 may be more taxing on the system 300 than communications with any given environment 300-1, 300-2, 300-3. Accordingly, in such cases processing and/or network resources required for evaluating a request (e.g., for basic authentication) may be reduced by configuring the access sidecar 310 to first attempt to resolve validation utilizing the cache 340a, and only querying the AD 340b in the case(s) that the cache 340a does not contain the necessary data. In some embodiments, the cache 340a may persist for a predetermined period or amount of time and/or until an occurrence of a predetermined triggering event. The cache 340a may be cleared every hour, for example, and/or after having received one thousand (1,000) requests, and/or upon reaching a data capacity threshold. In some embodiments, the cache 340a may be intermittently and/or incrementally cleared by deleting records that are more than two (2) hours old or are from the previous day. In such a manner, for example, memory requirements for the cache 340a may be balanced against communication requirements to access the AD 340b, reducing either or both of memory storage requirements and/or processing/network traffic resources required to process a high volume of incoming requests.

Fewer or more components 300-1, 300-2, 300-3, 302, 306, 308, 310, 340*a-b* and/or various configurations of the depicted components 300-1, 300-2, 300-3, 302, 306, 308, 310, 340*a-b* may be included in the system 300 without deviating from the scope of embodiments described herein. In some embodiments, the components 300-1, 300-2, 300-3, 302, 306, 308, 310, 340*a-b* may be similar in configuration and/or functionality to similarly named and/or numbered components as described herein. In some embodiments, the system 300 (and/or portions thereof) may comprise an improved high-volume computer service access management program, system, and/or platform programmed and/or otherwise configured to execute, conduct, and/or facilitate the methods/algorithms 400, 500, 800 of FIG. 4, FIG. 5A, FIG. 5B, and/or FIG. 8 herein, and/or portions or combinations thereof.

III. Improved High-Volume Computer Service Access Management Processes

Figure 4:
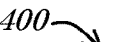
FIG. 4 is a system flow diagram of a method according to some embodiments.

Referring now to FIG. 4, a system flow diagram of a process or method 400 according to some embodiments is shown. The method 400 may, for example, be executed by various hardware and/or logical components via interactive communications, involving communications between a user device 402, a service device 406, an access device 410, a cache 440*a*, and/or a directory 440*b*. In some embodiments, the access device 410 may comprise various processes and/or components (not separately shown) that operate to intercept and/or evaluate requests (and/or other communications) between the user device 402 and the service device 406. While not explicitly depicted in FIG. 4, the devices 402, 406, 410, 440*a-b* may be in communication via various networks and/or network components, and/or may process received data by executing trained specially-coded instructions via one or more electronic processing devices (not separately shown). Any or all of the user device 402, the service device 406, access device 410, the cache 440*a*, and/or the directory 440*b* may be similar in configuration and/or functionality to similarly named and/or numbered components as described herein and/or may otherwise comprise and/or be executed, implemented, and/or facilitated by hardware, firmware, microcode, and/or programming elements implemented by one or more processing devices, computers, servers, and/or network devices.

The process diagrams and flow diagrams described herein do not necessarily imply a fixed order to any depicted actions, steps, and/or procedures, and embodiments may generally be performed in any order that is practicable unless otherwise and specifically noted. While the order of actions, steps, and/or procedures described herein is generally not fixed, in some embodiments, actions, steps, and/or procedures may be specifically performed in the order listed, depicted, and/or described and/or may be performed in response to any previously listed, depicted, and/or described action, step, and/or procedure. Any of the processes, methods, and/or algorithms described herein may be performed and/or facilitated by hardware, software (including microcode), firmware, or any combination thereof. For example, a storage medium (e.g., a hard disk, Random Access Memory (RAM) device, cache memory device, Universal Serial Bus (USB) mass storage device, and/or Digital Video Disk (DVD)); e.g., the memory devices 140, 240*a-b*, 340*a-b*, 640, 740*a-e*, 840 of FIG. 1, FIG. 2, FIG. 3, FIG. 6, FIG. 7A, FIG. 7B, FIG. 7C, FIG. 7D, FIG. 7E, and/or FIG. 8 herein) may store thereon instructions that when executed by a machine (such as a computerized processor) result in performance according to any one or more of the embodiments described herein.

In some embodiments, the method 400 (e.g., for providing improved high-volume computer service access management) may comprise and/or begin at "1" with setting and/or defining one or more records in the directory 440*b*. The record(s) in the directory 440*b* may define and/or comprise, for example, stored associations between various user names, passwords (an/or other credentials), and/or "targets" (i.e., devices, such as the service device 406, services, program modules, and/or computer system resources). According to some embodiments, a one-to-many relationship may be established between available services and users. Each available service may, for example, be accessible by a plurality of users and the directory 440*b* may store a listing and/or other indication of such authorizations. In some embodiments, the method 400 may comprise and/or continue to naming the service device 406 (and/or a service or resource thereof), at "2". According to some embodiments, a naming standardization protocol may be implemented wherein each available service (e.g., the service device 406) is named and/or identified by a respective IP/URL (and/or other network location identifying information, such as Domain Name System (DNS) records).

According to some embodiments, the method 400 may begin at (and/or comprise) "3" with transmitting or inputting a request from the user device 402. In some embodiments, the transmitting or inputting at "3" may comprise a transmission of information descriptive of a desired target location, service, and/or device, such as the service device 406 (and accordingly the receipt thereof by the service device 406). The information may include, for example, an indication of an IP/URL of the service device 406. According to some embodiments, the request/input may comprise authorization and/or authentication data, such as a user name, password, cryptographic key or hash, etc. In some embodiments, some of the information may be stored in a body of the request and some of the information may be stored in a header of the request. As described herein, the transmission of the request (at "3") may be routed to and/or intercepted by the access device 410. Instead of being forwarded and/or directed directly to the service device 406 (e.g., the intended target/destination), for example, the access device 410 may be utilized to first evaluate the request.

In some embodiments, the access device 410 may begin and/or initiate evaluating the request (e.g., in response to receiving the request) by querying the cache 440*a*, at "4". The access device 410 may transmit (and the cache 440*a* may receive), for example, an indication of the IP/URL and/or other identifier of the requested service device 406 (and/or service thereof). In some embodiments, this initial or first query may be configured to determine whether the desired/target service device 406 (and/or service) exists and/or is active or available. In such embodiments, the access device 410 may simply be searching for an indication that someone (e.g., any user) has accessed the service device 406 previously. In such a case, for example, it may be assumed that the service device 406 is valid and/or available. In some embodiments, the access device 410 may be searching for an indication that the particular user device 402 (and/or service or user thereof) has previously accessed the service device 406. In any case, the cache 440*a* may process the query at "5" and return a first query result to the access device 410, at "6". The first query result may indicate whether any records in the cache 440*a* match the IP/URL, for example, and/or may return a previous determination regarding the IP/URL, service device 406, etc.

According to some embodiments, the access device 410 may determine whether the service device 406 (and/or service thereof) is valid (e.g., exists and/or is active) based on the first query results, at "7". In the case that matching data is identified in the cache 440a and/or a previous positive evaluation result thereof is identified, the method 400 and/or access device 410 may skip and/or continue to conduct additional processing and/or queries, e.g., at "13". In the case that no records and/or a previous negative evaluation are identified from the first query results (e.g., querying the cache 440a does not resolve the validation of the service device 406), the access device 410 may determine that the validation utilizing the cache 440a has failed and may proceed to querying (e.g., a second query) the directory 440b, at "8". The directory 440b may process the second query at "9" and return a second query result to the access device 410, at "10a" or "10b". The second query result may indicate whether any records in the directory 440b match the IP/URL, for example, and/or may return a previous determination regarding the IP/URL, service device 406, etc.

In some embodiments, such as in a case where the second query does not identify any matching data (e.g., the service device 406 (and/or service thereof) is not valid and/or not active), the directory 440b (and/or the access device 410) may transmit a message, alert, and/or notification to the user device 402, at "10a". The message transmitted to (and accordingly received by) the user device 402 may indicate, for example, that the request has failed validation (and in some cases may include data defining the reason for failure; e.g., service device 406 (and/or service thereof) not found, not available, etc.). According to some embodiments, such as in a case where the second query does identify matching data (e.g., the service device 406 (and/or service thereof) is valid and/or active), the second query results may be transmitted to the access device 410, at "10b". In some embodiments, the access device 410 may determine whether the service device 406 (and/or service thereof) is valid (e.g., exists and/or is active) based on the second query results, at "11". According to some embodiments, the access device 410 may store a determination (positive or negative) of the validation of the service device 206 (and/or service thereof) in the cache 440a, at "12". In such a manner, for example, future requests from the same user device 402 and/or to the same service device 406 may be more quickly evaluated by simply consulting the cache 440a (e.g., the first query at "4").

According to some embodiments, the method 400 may comprise and/or the access device 410 may continue evaluating the request (e.g., in response to receiving the request) by querying (e.g., a third query) the cache 440a, at "13". The access device 410 may transmit (and the cache 440a may receive), for example, an indication of the IP/URL and/or other identifier of the requested service device 406 (and/or service thereof) and the user name from the request (and/or other identifier of the user device 402 (and/or the user, service, etc., thereof). In some embodiments, this third query may be configured to determine whether the user device 402 (and/or the user, service, etc., thereof) is authorized to access the desired/target service device 406 (and/or service). In such embodiments, the access device 410 may be searching for an indication that the user device 402 (and/or the user, service, etc., thereof) belongs to a group that has access rights to the desired/target service device 406 (and/or service). In some embodiments, the cache 440a may process the query at "14" and return a third query result to the access device 410, at "15". The third query result may indicate whether any records in the cache 440a match the IP/URL and/or user name, for example, and/or may return a previous determination regarding the authorization level and/or access rights of the user device 402 (and/or user or service thereof).

According to some embodiments, the access device 410 may determine whether the user device 402 (and/or the user, service, etc., thereof) belongs to a group that has access rights to the desired/target service device 406 (and/or service) based on the third query results, at "16". In the case that matching data is identified in the cache 440a and/or a previous positive evaluation result thereof is identified, the method 400 and/or access device 410 may skip and/or continue to conduct additional processing and/or queries, e.g., at "22". In the case that no records and/or a previous negative evaluation are identified from the third query results (e.g., querying the cache 440a does not resolve the authorization), the access device 410 may determine that the validation utilizing the cache 440a has failed and may proceed to querying (e.g., a fourth query) the directory 440b, at "17". The directory 440b may process the fourth query at "18" and return a fourth query result to the access device 410, at "19a" or "19b". The fourth query result may indicate whether any records in the directory 440b match the IP/URL and the user name, for example, and/or may return a previous determination regarding the authorization of the user name, user device 402, etc.

In some embodiments, such as in a case where the fourth query does not identify any matching data (e.g., the user device 402 (and/or the user, service, etc., thereof) is not authorized to access and/or utilize the desired/target service device 406 (and/or service)), the directory 440b (and/or the access device 410) may transmit a message, alert, and/or notification to the user device 402, at "19a". The message transmitted to (and accordingly received by) the user device 402 may indicate, for example, that the request has failed validation (and in some cases may include data defining the reason for failure; e.g., the user device 402 (and/or the user, service, etc., thereof) is not authorized to access and/or utilize the desired/target service device 406 (and/or service)). According to some embodiments, such as in a case where the fourth query does identify matching data (e.g., the user device 402 (and/or the user, service, etc., thereof) is authorized to access and/or utilize the desired/target service device 406 (and/or service)), the fourth query results may be transmitted to the access device 410, at "19b". In some embodiments, the access device 410 may determine whether the user device 402 (and/or the user, service, etc., thereof) is authorized to access and/or utilize the desired/target service device 406 (and/or service based on the fourth query results, at "20". According to some embodiments, the access device 410 may store a determination (positive or negative) of the authorization check/validation in the cache 440a, at "21". In such a manner, for example, future requests from the same user device 402 and/or to the same service device 406 may be more quickly evaluated by simply consulting the cache 440a (e.g., the first query at "4" and/or the third query at "13").

According to some embodiments, the method 400 may comprise and/or the access device 410 may continue evaluating the request (e.g., in response to receiving the request) by querying (e.g., a fifth query) the cache 440a, at "22". The access device 410 may transmit (and the cache 440a may receive), for example, an indication of the user name and password (and/or other credentials) from the request. In some embodiments, this fifth query may be configured to determine whether the user device 402 (and/or the user, service, etc., thereof) is authenticated (e.g., comprises valid credentials). In such embodiments, the access device 410 may be searching for an indication that the user device 402 (and/or the user, service, etc., thereof) can be authenticated as a verified/permitted user of the service device 406. In some embodiments, the cache 440*a* may process the query at "23" and return a fifth query result to the access device 410, at "24". The fifth query result may indicate whether any records in the cache 440*a* match the user name and password (e.g., credentials), for example, and/or may return a previous determination regarding the authentication of the credentials.

According to some embodiments, the access device 410 may determine whether the credentials are authentic based on the fifth query results, at "25". In the case that matching data is identified in the cache 440*a* and/or a previous positive evaluation result thereof is identified, the method 400 and/or access device 410 may skip and/or continue to conduct additional processing and/or queries, e.g., at "31". In the case that no records and/or a previous negative evaluation are identified from the fifth query results (e.g., querying the cache 440*a* does not resolve the authentication), the access device 410 may determine that the validation utilizing the cache 440*a* has failed and may proceed to querying (e.g., a sixth query) the directory 440*b*, at "26". The directory 440*b* may process the sixth query at "27" and return a sixth query result to the access device 410, at "28a" or "28b". The sixth query result may indicate whether any records in the directory 440*b* match the user name and password (e.g., credentials), for example, and/or may return a previous determination regarding the authentication of the credentials, user device 402, etc.

In some embodiments, such as in a case where the sixth query does not identify any matching data (e.g., the credentials of the user device 402, user, service, etc., are not authenticated, the directory 440*b* (and/or the access device 410) may transmit a message, alert, and/or notification to the user device 402, at "28a". The message transmitted to (and accordingly received by) the user device 402 may indicate, for example, that the request has failed validation (and in some cases may include data defining the reason for failure; e.g., the credentials have failed to be authenticated, invalid user name, invalid password, etc.). According to some embodiments, such as in a case where the sixth query does identify matching data (e.g., the credentials are authenticated), the sixth query results may be transmitted to the access device 410, at "28b". In some embodiments, the access device 410 may determine whether the credentials are authenticated, at "29". According to some embodiments, the access device 410 may store a determination (positive or negative) of the authentication check/validation in the cache 440*a*, at "30". In such a manner, for example, future requests from the same user device 402, same user name and password (and/or other same credentials), and/or to the same service device 406 may be more quickly evaluated by simply consulting the cache 440*a* (e.g., the first query at "4", the third query at "13", and/or the fifth query at "22").

According to some embodiments, such as in the case that the request passes all evaluation criteria (e.g., the service call is valid, the user is authorized to make the call, and the user is authenticated to be the actual user), the access device 410 may forward and/or permit the request to be transmitted onward to the service, at "31". While the process of the method 400 may be relatively complex between the original transmission of the request at "3" and the receiving of the request by the service device 406 via "31", particularly in the case that one or more of the queries to the cache 440*a* are successful, the entire interception and/or routing may add only approximately one millisecond of processing to the request submission, e.g., enabling a high-volume (e.g., thousands per hour to millions per day) of transactions to be effectively processed by the method 400 without unduly affecting the performance of any underlying computer service system. In some embodiments, the service device 406 may be executed at "32", e.g., utilizing data from the request/call, and may transmit a result and/or output to the user device 402 (and/or the access device 410) at "33".

While many specific actions of the method 400 have been described with respect to FIG. 4, fewer or more actions, transmissions, and/or processing procedures (e.g., query executions) may be implemented in the method 400 without deviating from embodiments herein. There are many different possible logical pathways for the method 400 to take with respect to query results within the method 400, for example, and only one of these plurality of possible pathways is fully depicted in FIG. 4, solely for ease of illustration. According to some embodiments, any transmission sent from an origin to a destination may be received by and/or at the destination, e.g., in response to the transmission. In some embodiments, fewer or more components 402, 406, 410, 440*a-b* and/or various configurations of the depicted components 402, 406, 410, 440*a-b* may be included in the method 400 without deviating from the scope of embodiments described herein. In some embodiments, the components 402, 406, 410, 440*a-b* may be similar in configuration and/or functionality to similarly named and/or numbered components as described herein. In some embodiments, the method 400 (and/or one or more portions thereof) may comprise an improved high-volume computer service access management program, system, and/or platform programmed and/or otherwise configured to execute, conduct, and/or facilitate the methods/algorithms 500, 800 of FIG. 5A, FIG. 5B, and/or FIG. 8 herein, and/or portions or combinations thereof.

Figure 5B:
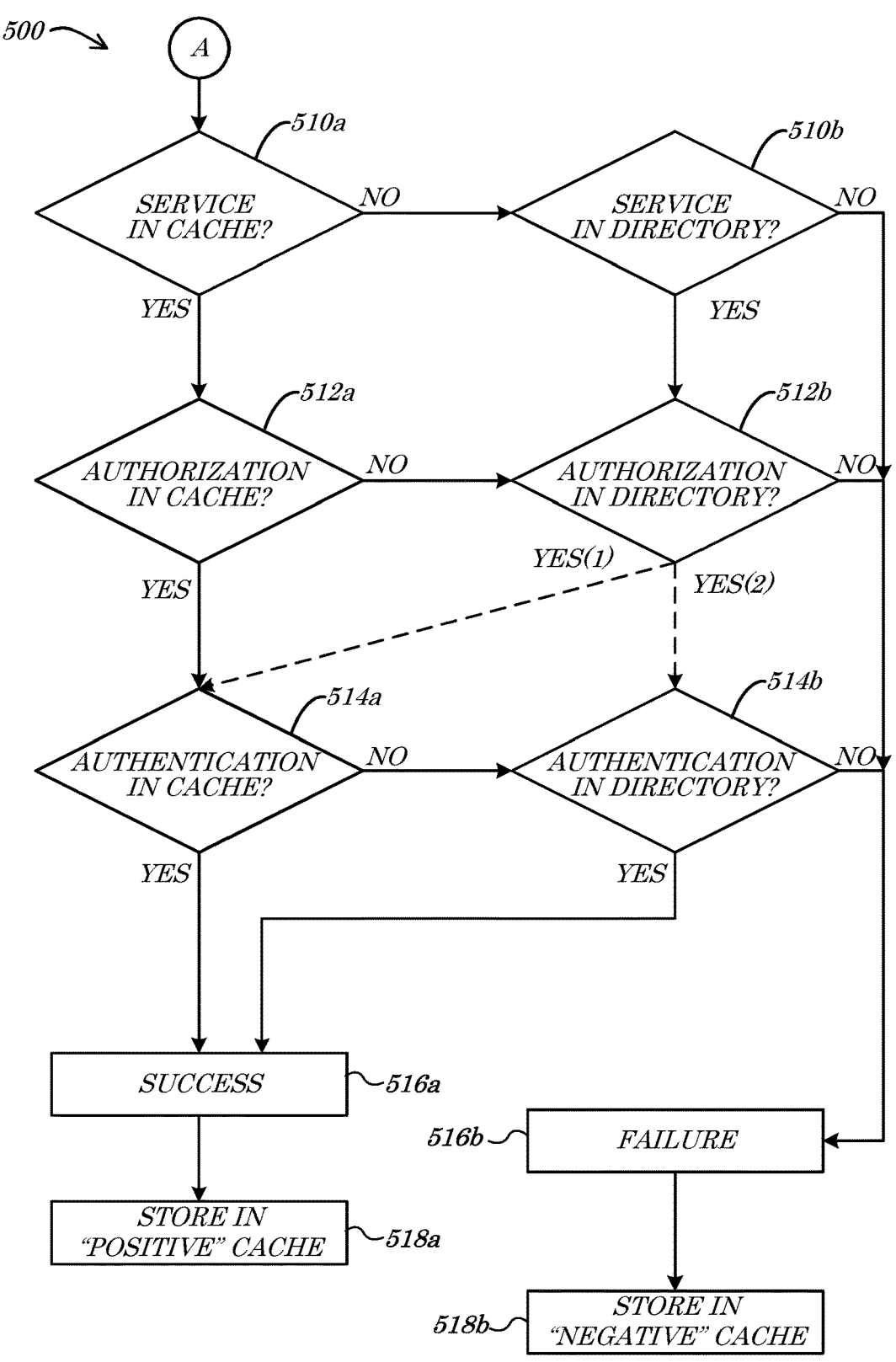
Figure 6:
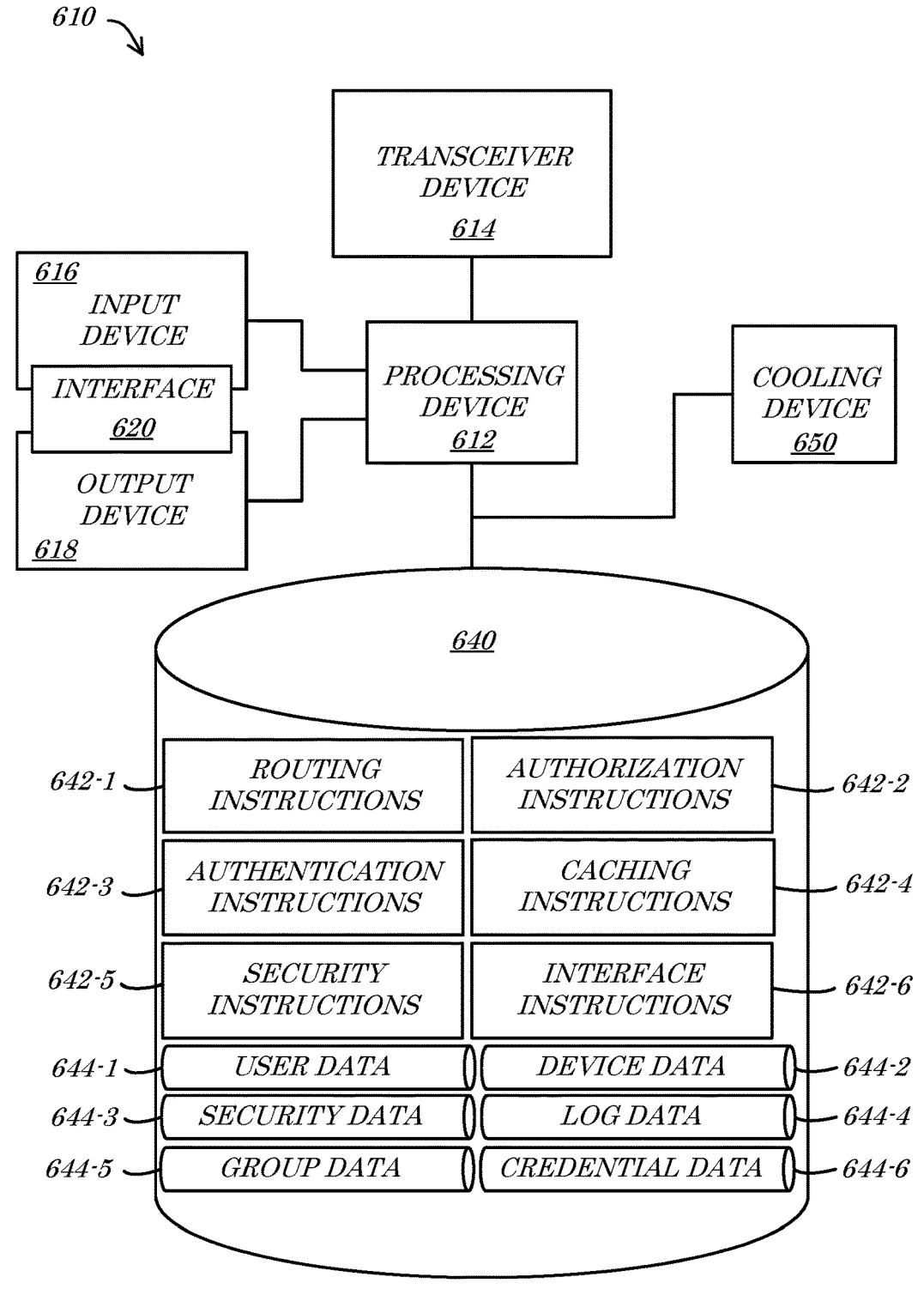
FIG. 6 is a block diagram of an apparatus according to some embodiments.
Figure 7A:
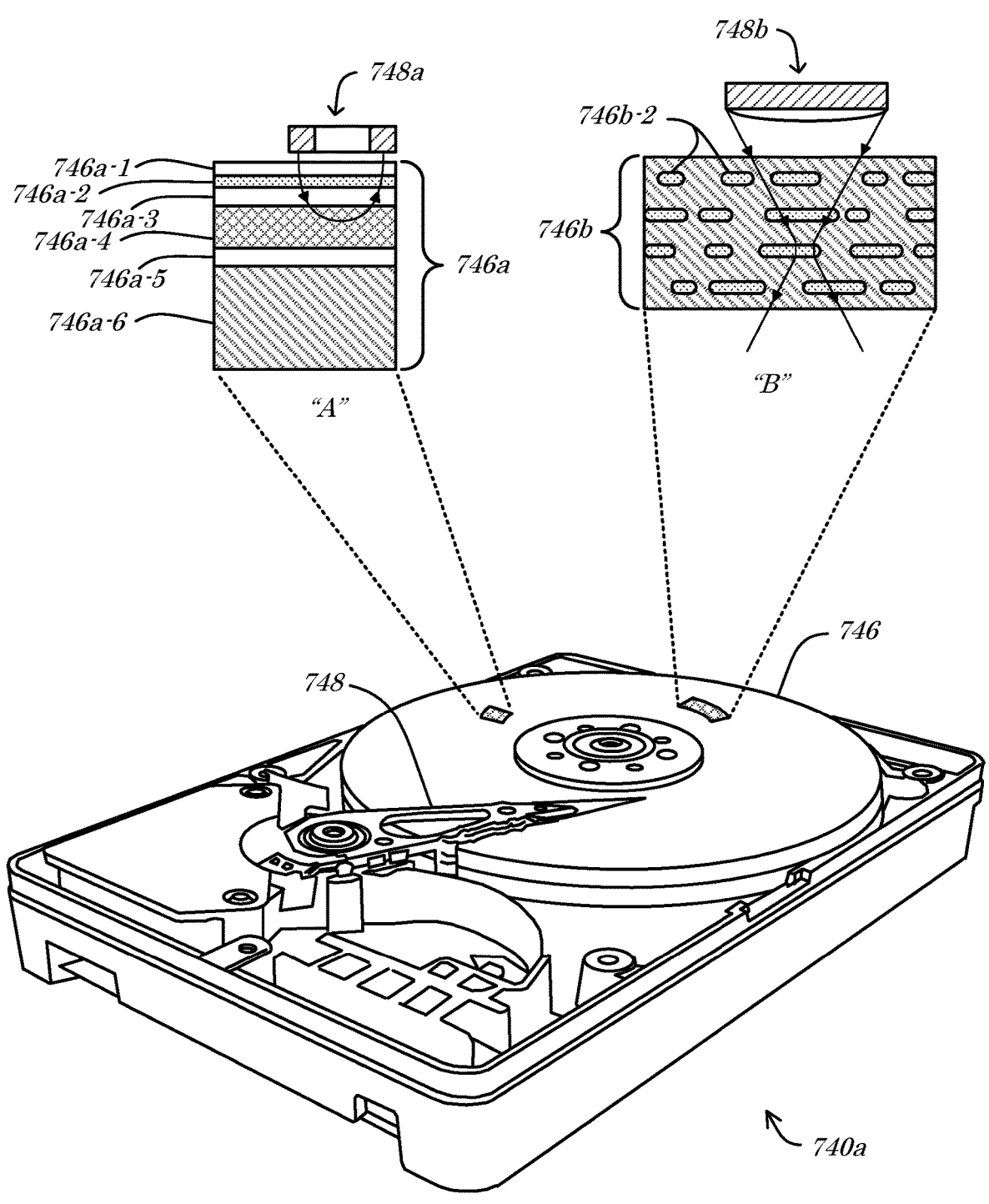
FIG. 7A, FIG. 7B, FIG. 7C, FIG. 7D, and FIG. 7E are perspective diagrams of exemplary data storage devices according to some embodiments.
Figure 7B:
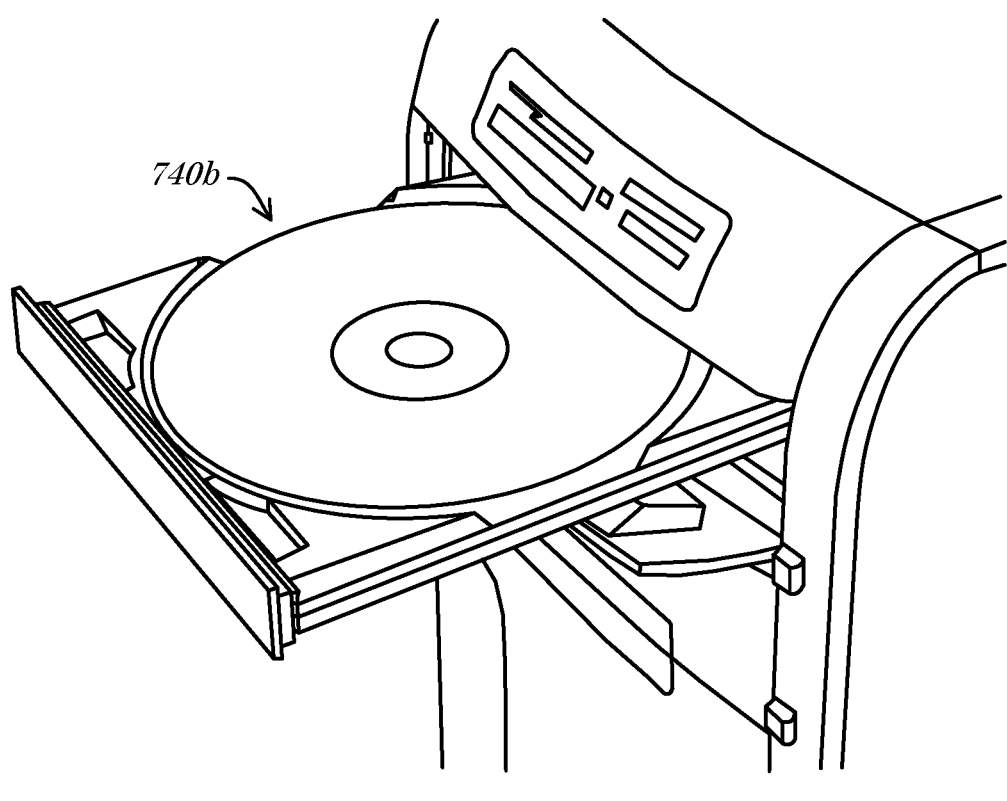
Figure 7C:
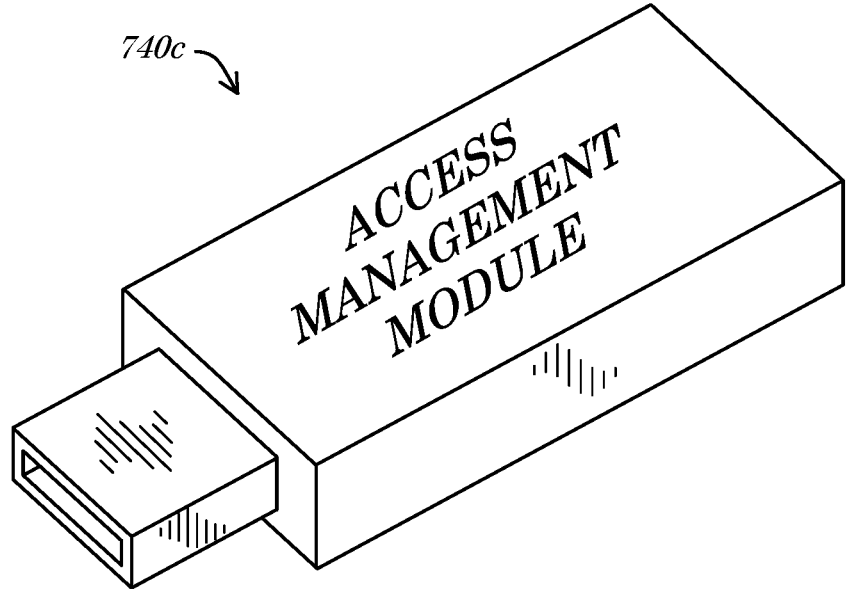
Figure 7D:
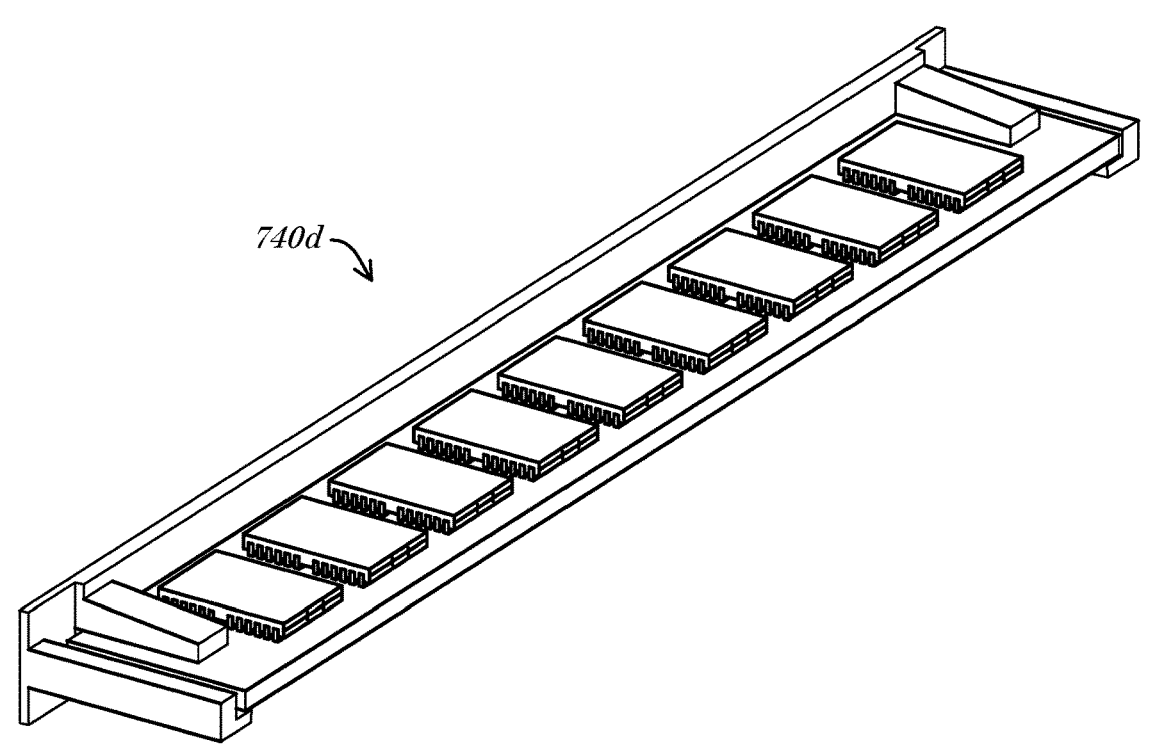
Figure 7E:
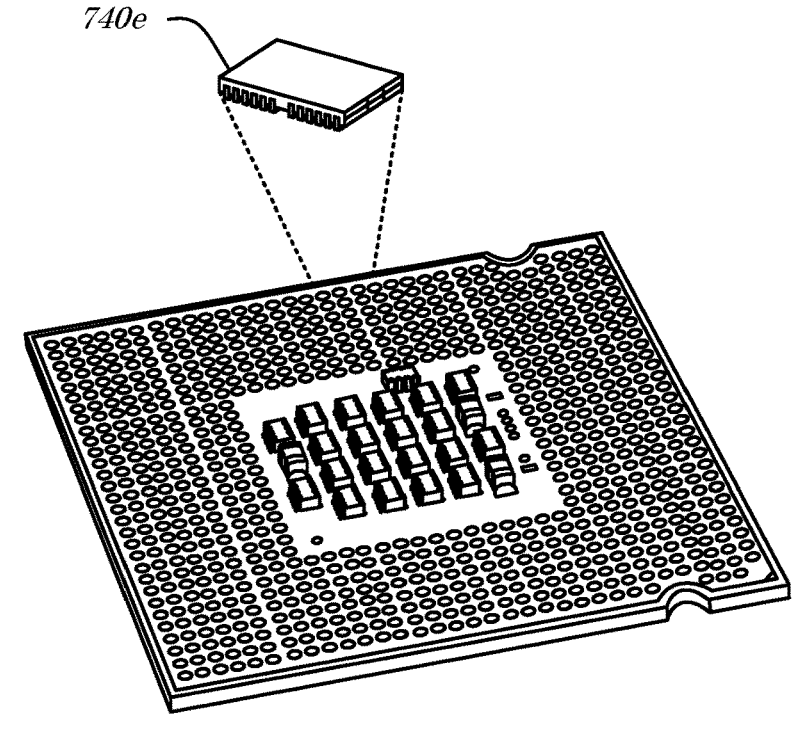

Referring now to FIG. 5A and FIG. 5B, a flow diagram of a method 500 according to some embodiments is shown. In some embodiments, the method 500 may be performed and/or implemented by and/or otherwise associated with one or more specialized and/or specially-programmed computers (e.g., the source/user devices 102*a-n*, 202, 302, 402, the target/service devices 106*a-n*, 206, 306, 406 and/or the server/access devices/apparatus 110, 210, 310, 410, 610, all of FIG. 1, FIG. 2, FIG. 3, FIG. 4, and/or FIG. 6 herein), computer terminals, computer servers, computer systems and/or networks, and/or any combinations thereof (e.g., by one or more multi-threaded and/or multi-core processing units of an improved high-volume computer service access management system). In some embodiments, the method 500 may be embodied in, facilitated by, and/or otherwise associated with various input mechanisms and/or interfaces (e.g., the interface 620 of FIG. 6 herein).

According to some embodiments, and with initial reference to FIG. 5A, the method 500 may comprise configuring (e.g., by a processing device) a service and/or a directory, at 502. One or more services and/or one or more directories may be coded and/or loaded with data elements, for example, that e.g., (i) identify a name and/or identifier (e.g., unique) of the service, (ii) identify a network address and/or location of the service, (iii) identify one or more user names, services, and/or devices that are authorized to access and/or utilize the service, (iv) identify one or more user names, passwords, pass-phrases, keys, hashes, and/or credentials for accessing/invoking the service, and/or (v) identify one or more data input elements, such as parameter values, metrics, variables, files, and/or other data to be utilized as input for the execution of the service. In some embodiments, the authorization and/or authentication data stored in the directory (e.g., an AD and/or utilizing AD LDS) may comprise various rules, criteria, and/or Multi-Factor Authentication (MFA) data, such as telephone numbers, email addresses, third-party authentication application data, etc. According to some embodiments, the service(s) may be named and/or identified by a respective network location identifier, such as an IP and/or URL. According to some embodiments, an access, rights, and/or security group that governs authorization to access the service(s) may comprises a listing of user names (and/or other identifiers) in association with the IP/URL/name of the service.

In some embodiments, the method 500 may comprise receiving (e.g., by the processing device, via an electronic communication network, and/or from a remote user device and/or interface) a request for an execution of a service, at 504. The service request (input) may, for example, be generated by a remote user device (e.g., an employee workstation and/or first service) operated by an entity desiring to receive a response/output from the target service. In some embodiments, the service request may comprise data/ content (e.g., text, images, audio, video, etc.) that is descriptive of a query and/or task that the user wishes the service to resolve. In some embodiments, the service request may include a plurality of prompts, data elements, values, and/or characters. According to some embodiments, the service request may comprise and/or include data descriptive of and/or identifying the user, a device of the user, a name, IP address, URL, and/or other identifier of the target service, a user name, password, and/or other credentials, e.g., explicitly as part of the request and/or hidden/embedded, such as in a data packet header, metadata, etc. According to some embodiments, the request may be received by a computer system and/or a component thereof (such as a router).

According to some embodiments, the method 500 may comprise intercepting/directing (e.g., by the processing device) the request to an access management device/service, at 506. The request received by the computer system may be intercepted and/or directed or routed to an access management device, tool, service, and/or module, e.g., for request evaluation/validation. In some embodiments, the request may be received by the access management device/service due to configuration settings of the underlying computer environment (e.g., container settings and/or automatic routing functionality). According to some embodiments, the intercepting/directing may be performed without knowledge of the user device and/or user from which the request originated. The routing/intercepting may, for example, be performed by back-end data transmission processing that is not made visible to clients/users.

In some embodiments, the method 500 may comprise evaluating (e.g., by the processing device) the service request, at 508. The request may be evaluated for basic authentication, for example, and/or for more complex rules, threshold, criteria, and/or logic-based processing. In some embodiments, the access management service may evaluate the request for validity (e.g., whether the requested service/ target is valid/active), authorization (e.g., whether the requestor is authorized to access/utilize the service/target), and/or authentication (e.g., whether the requestor can be verified to be who they say they are—e.g., their credentials are valid). According to some embodiments, the access management service and/or the method 500 may evaluate the request by proceeding to "A", as depicted in detail in FIG. 5B.

From "A", and in accordance with some embodiments, for example, the access management service and/or the method 500 may comprise determining (e.g., by the processing device) whether the requested target/service is stored in a cache, at 510a. Data elements of the request may be compared to data stored in the cache and/or evaluated utilizing stored rules, for example, to determine whether the request (or various portions or elements thereof) is directed to, calls, and/or attempts to invoke a valid target/service/ resource. According to some embodiments, a URL, IP address, and/or other identifier of the requested target/ service may be utilized to query the cache. In some embodiments, such as in the case that data associated with (e.g., descriptive of) the requested target/service is not found in the cache (e.g., no data matches are identified), the method 500 may proceed to and/or comprise searching a directory for the target/service data, at 510b. In the case that data associated with (e.g., descriptive of) and/or identifying the request is not found in the directory, the method 500 may proceed to and/or comprise identifying a failure, at 516b. In the case that data associated with (e.g., descriptive of) and/or identifying the request is found in the directory at 510b, and/or in the case that data associated with (e.g., descriptive of) and/or identifying the request is found in the cache at 510a, the method 500 may proceed to and/or comprise determining (e.g., by the processing device) whether the requestor is authorized to access the requested target/service, by querying either the cache at 512a or the directory at 512b.

In some embodiments, authorization may be identified in a case that the user name and/or other identifier of the requestor (i.e., user, first service, user device, etc.) is stored in relation to an access, security, and/or rights group assigned to the requested target/service. According to some embodiments, such as in the case that the cache is queried to determine whether the requestor is authorized to access the requested target/service at 512a, in the case that no authorization data is found in the cache (e.g., no record of the user name of the requestor/source with respect to the target/service and/or no indication of a previous authorization determination) the method 500 may proceed to and/or comprise querying/searching the directory at 512b. In the case that data associated with (e.g., descriptive of) and/or identifying an authorization for the request is not found in the directory, the method 500 may proceed to and/or comprise identifying the failure, at 516b. In the case that data associated with (e.g., descriptive of) and/or identifying an authorization for the request is found in the directory at 512b, and/or in the case that data associated with (e.g., descriptive of) and/or identifying an authorization for the request is found in the cache at 512a, the method 500 may proceed to and/or comprise determining (e.g., by the processing device) whether the requestor is authenticated, by querying either the cache at 514a or the directory at 514b.

According to some embodiments, authentication may be identified in a case that the user name and password and/or other credentials of the requestor are stored in relation to the requested target/service. According to some embodiments, such as in the case that the cache is queried to determine whether the requestor is authenticated at 514a, in the case that no authentication data is found in the cache (e.g., no record of the user name and password and/or no indication of a previous authentication determination) the method 500 may proceed to and/or comprise querying/searching the directory at 514*b*. In the case that data associated with (e.g., descriptive of) and/or identifying an authentication is not found in the directory, the method 500 may proceed to and/or comprise identifying the failure, at 516*b*. In the case that data associated with (e.g., descriptive of) and/or identifying an authentication is found in the directory at 514*b*, and/or in the case that data associated with (e.g., descriptive of) and/or identifying an authentication is found in the cache at 514*a*, the method 500 may proceed to and/or comprise determining (e.g., by the processing device) a success, at 516*a*.

In some embodiments, whether the evaluation results in a success at 516*a* or a failure at 516*b*, the results of the evaluation may be stored in the cache at 518*a-b*. In the case of a success at 518*a*, the storing of data indicative of a successful evaluation in the cache may be described as a storing in a "positive" cache at 518*a*. In the case of a failure at 516*b*, the storing of data indicative of a failed evaluation in the cache may be described as a storing in a "negative" cache at 518*b*. According to some embodiments, the "positive" and "negative" cache labels may simply be descriptive of the data stored therein, while in some embodiments different memory segments, tracks, sectors, databases, files, and/or devices may be utilized to store the "positive" and "negative" determinations separately. In some embodiments, the "positive" cache may be utilized to speed and/or reduce resource costs of future evaluations and/or the "negative" cache may be utilized to identify and/or block repetitive and/or malicious access attempts. After a threshold number of failed access attempts from a particular user, device, IP, service, etc., for example, future attempts identified as having exceeded the threshold in the "negative" cache may be blocked initially (e.g., upon receipt), without requiring and/or wasting additional processing, network, and/or memory resources. Such functionality may, for example, be beneficial in thwarting Denial-of-Service (DoS) attacks.

According to some embodiments (and with reference back to FIG. 5A), the access management service and/or the method 500 may comprise determining (e.g., by the processing device) whether the request is valid, at 520. Based on results returned from "A" (e.g., "success" or "failure") and/or based on a comparison of request data to stored rules, criteria, and/or thresholds, for example, the access management service may identify whether the request is valid (e.g., a success) or not valid (e.g., a failure). In some embodiments, such as in the case that the request is determined/ identified to not be valid, the access management service and/or the method 500 may comprise sending (e.g., by the processing device, via the electronic communication network, and/or to the remote user device and/or interface) an error message, at 522. The error message may indicate the reason for the request not being valid or may simply indicate that the request has failed. According to some embodiments, the evaluation may be retried and only deemed to be not valid after a threshold number of failures. According to some embodiments, such as in the case that the request is determined/identified to be valid, the access management service and/or the method 500 may comprise transmitting (e.g., by the processing device and/or via the electronic communication network) the request to the service, at 524. Once the service request is cleared by the access management service (e.g., validated) to be forwarded and/or transmitted, for example, information indicative of the request may be transmitted and/or provided to the requested/target service (e.g., as requested by the user).

In some embodiments, the access management service and/or the method 500 may comprise receiving (e.g., by the processing device and/or via the electronic communication network) a response from the service, at 526. The service response may be received subsequent to and/or in response to the transmission/submission of the service request, for example. In some embodiments, the service response may comprise various data elements, such as files, values, parameters, text, audio, and/or image/video elements, in accordance with the functionality of the service/target.

According to some embodiments, the access management service and/or the method 500 may comprise forwarding or outputting (e.g., by the processing device, via the electronic communication network, and/or to the remote user device and/or interface) the response, at 528. The access management service may pass the service response to the user that requested the service, for example, e.g., in response to the original receiving of the service request, at 504 (and/or the routing/interception at 506). In some embodiments, the service request may be entered by the user into the interface and the service responses may be output in response to the request via the same interface. In such a manner, for example, and in a case where the service request passes the evaluation, the communication between the user and the service may appear to occur seamlessly to the user. In other words, the presence and/or operation of the access management service may not be discernible to the user (e.g., unless the request is rejected for failing the evaluation/validation).

In some embodiments, any transmissions that are sent and/or received between the various devices that may be utilized by the parties to the improved high-volume computer service access management system may be secured via any compression and/or encryption protocols that are or become known or practicable. According to some embodiments, fewer or more devices, data storage structures, and/or process executions may be included in the method 500.

IV. Improved High-Volume Computer Service Access Management Apparatus, Articles of Manufacture, and Algorithms Turning to FIG. 6, a block diagram of an apparatus 610 according to some embodiments is shown. In some embodiments, the apparatus 610 may be similar in configuration and/or functionality to any of the source/user devices 102*a-n*, 202, 302, 402, the target/service devices 106*a-n*, 206, 306, 406 and/or the server/access devices/apparatus 110, 210, 310, 410, all of FIG. 1, FIG. 2, FIG. 3, and/or FIG. 4 herein. The apparatus 610 may, for example, execute, process, facilitate, and/or otherwise be associated with the methods/ algorithms 400, 500, 800 of FIG. 4, FIG. 5A, FIG. 5B, and/or FIG. 8 herein, and/or portions or combinations thereof. In some embodiments, the apparatus 610 may comprise a processing device 612, a transceiver device 614, an input device 616, an output device 618, an interface 620, a memory device 640 (storing various programs and/or instructions 642-1, 642-2, 642-3, 642-4, 642-5, 642-6 and data 644-1, 644-2, 644-3, 64-4, 644-5, 644-6), and/or a cooling device 650. According to some embodiments, any or all of the components 612, 614, 616, 618, 620, 640, 642-1, 642-2, 642-3, 642-4, 642-5, 642-6, 644-1, 644-2, 644-3, 64-4, 644-5, 644-6, 650 of the apparatus 610 may be similar in configuration and/or functionality to any similarly named and/or numbered components described herein. Fewer or more components 612, 614, 616, 618, 620, 640, 642-1, 642-2, 642-3, 642-4, 642-5, 642-6, 644-1, 644-2, 644-3, 64-4, 644-5, 644-6, 650 and/or various configurations of the components 612, 614, 616, 618, 620, 640, 642-1, 642-2, 642-3, 642-4, 642-5, 642-6, 644-1, 644-2, 644-3, 64-4, 644-5, 644-6, 650 be included in the apparatus 610 without deviating from the scope of embodiments described herein.

According to some embodiments, the processor 612 may be or include any type, quantity, and/or configuration of processor that is or becomes known. The processor 612 may comprise, for example, an Intel® IXP 2800 network processor or an Intel® XEON™ Processor coupled with an Intel® E8501 chipset. In some embodiments, the processor 612 may comprise multiple inter-connected processors, microprocessors, and/or micro-engines. According to some embodiments, the processor 612 (and/or the apparatus 610 and/or other components thereof) may be supplied power via a power supply (not shown), such as a battery, an Alternating Current (AC) source, a Direct Current (DC) source, an AC/DC adapter, solar cells, and/or an inertial generator. In the case that the apparatus 610 comprises a server, such as a blade server, necessary power may be supplied via a standard AC outlet, power strip, surge protector, and/or Uninterruptible Power Supply (UPS) device.

In some embodiments, the transceiver device 614 may comprise any type or configuration of communication device that is or becomes known or practicable. The transceiver device 614 may, for example, comprise a Network Interface Card (NIC), a telephonic device, a cellular network device, a router, a hub, a modem, and/or a communications port or cable. According to some embodiments, the transceiver device 614 may also or alternatively be coupled to the processor 612. In some embodiments, the transceiver device 614 may comprise an IR, RF, Bluetooth™, Near-Field Communication (NFC), and/or Wi-Fi® network device coupled to facilitate communications between the processor 612 and another device (not shown).

According to some embodiments, the input device 616 and/or the output device 618 are communicatively coupled to the processor 612 (e.g., via wired and/or wireless connections and/or pathways) and they may generally comprise any types or configurations of input and output components and/or devices that are or become known, respectively. The input device 616 may comprise, for example, a keyboard that allows an operator of the apparatus 610 to interface with the apparatus 610 (e.g., by a programmer to configure a service and/or a directory, as described herein). The output device 618 may, according to some embodiments, comprise a display screen and/or other practicable output component and/or device. The output device 618 may, for example, provide an interface (such as the interface 620) via which improved high-volume computer service access management is provided and/or facilitated. According to some embodiments, the input device 616 and/or the output device 618 may comprise and/or be embodied in a single device, such as a touch-screen monitor.

The memory device 640 may comprise any appropriate information storage device that is or becomes known or available, including, but not limited to, units and/or combinations of magnetic storage devices (e.g., a hard disk drive), optical storage devices, and/or semiconductor memory devices, such as RAM devices, Read Only Memory (ROM) devices, Single Data Rate Random Access Memory (SDR-RAM), Double Data Rate Random Access Memory (DDR-RAM), and/or Programmable Read Only Memory (PROM). The memory device 640 may, according to some embodiments, store one or more of routing instructions 642-1, authorization instructions 642-2, authentication instructions 642-3, caching instructions 642-4, security instructions 642-5, interface instructions 642-6, user data 644-1, device data

644-2, security data 644-3, log data 644-4, group data 644-5, and/or credential data 644-6. In some embodiments, the routing instructions 642-1, authorization instructions 642-2, authentication instructions 642-3, caching instructions 642-4, security instructions 642-5, interface instructions 642-6, user data 644-1, device data 644-2, security data 644-3, log data 644-4, group data 644-5, and/or credential data 644-6 may be utilized by the processor 612 to provide output information via the output device 618 and/or the transceiver device 614.

According to some embodiments, the routing instructions 642-1 may be operable to cause the processor 612 to process the user data 644-1, device data 644-2, security data 644-3, log data 644-4, group data 644-5, and/or credential data 644-6 in accordance with embodiments as described herein. User data 644-1, device data 644-2, security data 644-3, log data 644-4, group data 644-5, and/or credential data 644-6 received via the input device 616 and/or the transceiver device 614 may, for example, be analyzed, sorted, filtered, decoded, decompressed, ranked, scored, plotted, and/or otherwise processed by the processor 612 in accordance with the routing instructions 642-1. In some embodiments, user data 644-1, device data 644-2, security data 644-3, log data 644-4, group data 644-5, and/or credential data 644-6 may be fed by the processor 612 through one or more mathematical and/or statistical formulas and/or models in accordance with the routing instructions 642-1 to automatically direct and/or intercept incoming requests (e.g., service requests) for evaluation, as described herein.

In some embodiments, the authorization instructions 642-2 may be operable to cause the processor 612 to process the user data 644-1, device data 644-2, security data 644-3, log data 644-4, group data 644-5, and/or credential data 644-6 in accordance with embodiments as described herein. User data 644-1, device data 644-2, security data 644-3, log data 644-4, group data 644-5, and/or credential data 644-6 received via the input device 616 and/or the transceiver device 614 may, for example, be analyzed, sorted, filtered, decoded, decompressed, ranked, scored, plotted, and/or otherwise processed by the processor 612 in accordance with the authorization instructions 642-2. In some embodiments, user data 644-1, device data 644-2, security data 644-3, log data 644-4, group data 644-5, and/or credential data 644-6 may be fed by the processor 612 through one or more mathematical and/or statistical formulas and/or models in accordance with the authorization instructions 642-2 to determine whether a request is authorized and/or valid, as described herein.

According to some embodiments, the authentication instructions 642-3 may be operable to cause the processor 612 to process the user data 644-1, device data 644-2, security data 644-3, log data 644-4, group data 644-5, and/or credential data 644-6 in accordance with embodiments as described herein. User data 644-1, device data 644-2, security data 644-3, log data 644-4, group data 644-5, and/or credential data 644-6 received via the input device 616 and/or the transceiver device 614 may, for example, be analyzed, sorted, filtered, decoded, decompressed, ranked, scored, plotted, and/or otherwise processed by the processor 612 in accordance with the authentication instructions 642-3. In some embodiments, user data 644-1, device data 644-2, security data 644-3, log data 644-4, group data 644-5, and/or credential data 644-6 may be fed by the processor 612 through one or more mathematical and/or statistical formulas and/or models in accordance with the authentication instructions 642-3 to determine whether a request is authentic and/or valid, as described herein.

In some embodiments, the caching instructions 642-4 may be operable to cause the processor 612 to process the user data 644-1, device data 644-2, security data 644-3, log data 644-4, group data 644-5, and/or credential data 644-6 in accordance with embodiments as described herein. User data 644-1, device data 644-2, security data 644-3, log data 644-4, group data 644-5, and/or credential data 644-6 received via the input device 616 and/or the transceiver device 614 may, for example, be analyzed, sorted, filtered, decoded, decompressed, ranked, scored, plotted, and/or otherwise processed by the processor 612 in accordance with the caching instructions 642-4. In some embodiments, user data 644-1, device data 644-2, security data 644-3, log data 644-4, group data 644-5, and/or credential data 644-6 may be fed by the processor 612 through one or more mathematical and/or statistical formulas and/or models in accordance with the caching instructions 642-4 to automatically store, retrieve, and/or clear cache data, e.g., to effectuate request validation, as described herein.

According to some embodiments, the security instructions 642-5 may be operable to cause the processor 612 to process the user data 644-1, device data 644-2, security data 644-3, log data 644-4, group data 644-5, and/or credential data 644-6 in accordance with embodiments as described herein. User data 644-1, device data 644-2, security data 644-3, log data 644-4, group data 644-5, and/or credential data 644-6 received via the input device 616 and/or the transceiver device 614 may, for example, be analyzed, sorted, filtered, decoded, decompressed, ranked, scored, plotted, and/or otherwise processed by the processor 612 in accordance with the security instructions 642-5. In some embodiments, user data 644-1, device data 644-2, security data 644-3, log data 644-4, group data 644-5, and/or credential data 644-6 may be fed by the processor 612 through one or more mathematical and/or statistical formulas and/or models in accordance with the security instructions 642-5 to evaluate incoming requests (e.g., service requests) to identify security events, as described herein.

In some embodiments, the interface instructions 642-6 may be operable to cause the processor 612 to process the user data 644-1, device data 644-2, security data 644-3, log data 644-4, group data 644-5, and/or credential data 644-6 in accordance with embodiments as described herein. User data 644-1, device data 644-2, security data 644-3, log data 644-4, group data 644-5, and/or credential data 644-6 received via the input device 616 and/or the transceiver device 614 may, for example, be analyzed, sorted, filtered, decoded, decompressed, ranked, scored, plotted, and/or otherwise processed by the processor 612 in accordance with the interface instructions 642-6. In some embodiments, user data 644-1, device data 644-2, security data 644-3, log data 644-4, group data 644-5, and/or credential data 644-6 may be fed by the processor 612 through one or more mathematical and/or statistical formulas and/or models in accordance with the interface instructions 642-6 to generate and/or provide interfaces and/or interface elements for submitting and/or receiving responses to service requests, as described herein.

According to some embodiments, the apparatus 610 may comprise the cooling device 650. According to some embodiments, the cooling device 650 may be coupled (physically, thermally, and/or electrically) to the processor 612 and/or to the memory device 640. The cooling device 650 may, for example, comprise a fan, heat sink, heat pipe, radiator, cold plate, and/or other cooling component or device or combinations thereof, configured to remove heat from portions or components of the apparatus 610.

Any or all of the exemplary instructions and data types described herein and other practicable types of data may be stored in any number, type, and/or configuration of memory devices that is or becomes known. The memory device 640 may, for example, comprise one or more data tables or files, databases, table spaces, registers, and/or other storage structures. In some embodiments, multiple databases and/or storage structures (and/or multiple memory devices 640) may be utilized to store information associated with the apparatus 610. According to some embodiments, the memory device 640 may be incorporated into and/or otherwise coupled to the apparatus 610 (e.g., as shown) or may simply be accessible to the apparatus 610 (e.g., externally located and/or situated).

Referring to FIG. 7A, FIG. 7B, FIG. 7C, FIG. 7D, and FIG. 7E, perspective diagrams of exemplary data storage devices 740*a-e* according to some embodiments are shown. The data storage devices 740*a-e* may, for example, be utilized to store instructions and/or data, such as the routing instructions 642-1, authorization instructions 642-2, authentication instructions 642-3, caching instructions 642-4, security instructions 642-5, interface instructions 642-6, user data 644-1, device data 644-2, security data 644-3, log data 644-4, group data 644-5, and/or credential data 644-6, each of which is presented in reference to FIG. 6 herein. In some embodiments, instructions stored on the data storage devices 740*a-e* may, when executed by a processor, cause the implementation of and/or facilitate the methods/algorithms 400, 500, 800 of FIG. 4, FIG. 5A, FIG. 5B, and/or FIG. 8 herein, and/or portions or combinations thereof.

According to some embodiments, the first data storage device 740*a* may comprise one or more various types of internal and/or external hard drives. The first data storage device 740*a* may, for example, comprise a data storage medium 746 that is read, interrogated, and/or otherwise communicatively coupled to and/or via a disk reading device 748. In some embodiments, the first data storage device 740*a* and/or the data storage medium 746 may be configured to store information utilizing one or more magnetic, inductive, and/or optical means (e.g., magnetic, inductive, and/or optical-encoding). The data storage medium 746, depicted as a first data storage medium 746*a* for example (e.g., breakout cross-section "A"), may comprise one or more of a polymer layer 746*a*-1, a magnetic data storage layer 746*a*-2, a non-magnetic layer 746*a*-3, a magnetic base layer 746*a*-4, a contact layer 746*a*-5, and/or a substrate layer 746*a*-6. According to some embodiments, a magnetic read head 748*a* may be coupled and/or disposed to read data from the magnetic data storage layer 746*a*-2.

In some embodiments, the data storage medium 746, depicted as a second data storage medium 746*b* for example (e.g., breakout cross-section "B"), may comprise a plurality of data points 746*b*-2 disposed with the second data storage medium 746*b*. The data points 746*b*-2 may, in some embodiments, be read and/or otherwise interfaced with via a laser-enabled read head 748*b* disposed and/or coupled to direct a laser beam through the second data storage medium 746*b*.

In some embodiments, the second data storage device 740*b* may comprise a CD, CD-ROM, DVD, Blu-Ray™ Disc, and/or other type of optically-encoded disk and/or other storage medium that is or becomes know or practicable. In some embodiments, the third data storage device 740*c* may comprise a USB keyfob, dongle, and/or other type of flash memory data storage device that is or becomes know or practicable. In some embodiments, the fourth data storage device 740*d* may comprise RAM of any type, quantity, and/or configuration that is or becomes practicable and/or desirable. In some embodiments, the fourth data storage device 740*d* may comprise an off-chip cache, such as a Level 2 (L2) cache memory device. According to some embodiments, the fifth data storage device 740*e* may comprise an on-chip memory device, such as a Level 1 (L1) cache memory device.

The data storage devices 740*a-e* may generally store program instructions, code, and/or modules that, when executed by a processing device cause a particular machine to function in accordance with one or more embodiments described herein. The data storage devices 740*a-e* depicted in FIG. 7A, FIG. 7B, FIG. 7C, FIG. 7D, and FIG. 7E are representative of a class and/or subset of computer-readable media that are defined herein as "computer-readable memory" (e.g., non-transitory memory devices as opposed to transmission devices or media).

Figure 8:
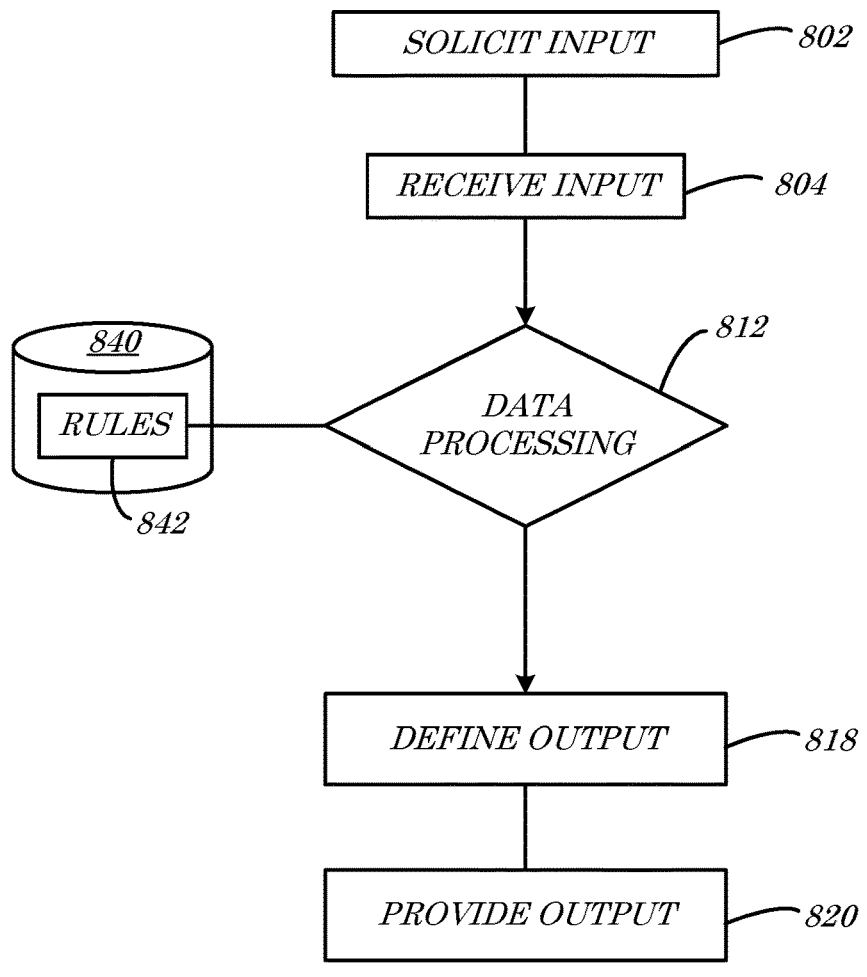
FIG. 8 is a flow diagram of an algorithm according to some embodiments.

With reference to FIG. 8, for example, the data storage devices 740*a-e* may store and/or define an algorithm 800. The algorithm 800 may comprise, for example, one or more software programs, modules, engines, models (e.g., AI models), and/or applications coded to perform any of the methods/algorithms 400, 500, 800 of FIG. 4, FIG. 5A, FIG. 5B, and/or FIG. 8 herein, and/or portions or combinations thereof. The algorithm 800, and any reference to the term "algorithm" herein, refers to any set of defined instructions and/or trained instruction, guidelines, and/or prompt sets that operate upon input to define and/or provide output. The algorithm 800 may, for example, be specifically programmed, trained, and/or otherwise defined to instruct a computer or other device (not shown) to solve a particular problem (e.g., logical) and/or resolve a particular mathematical calculation (e.g., arithmetic). In some embodiments, the algorithm 800 may be written and/or defined as a series or sequence of instructions, guidelines, formulas, thresholds, rules, and/or prompts encoded in (e.g., written in accordance with syntax and/or semantics rules) a particular computer programming language (e.g., Python™, Java™, JavaScript™, C, C++, C#, Basic™, FORTRAN, COBOL, Ruby™, and/or Perl™), e.g., a set of instructions that convert and/or encode characters, objects, and/or other data elements into machine code (e.g., code operable to be executed by an electronic processing device, such as a Central Processing Unit (CPU)).

According to some embodiments, the algorithm 800 may comprise soliciting input, at 802. Input from one or more sources may be searched for and/or queried, by structuring and/or executing a database query and/or by sending a data communication signal or "handshake", such as is common with Bluetooth® short-range communication protocols. In some embodiments, the algorithm 800 may comprise receiving the input, at 804. Whether solicited or otherwise provided and/or acquired (e.g., loaded and/or downloaded), for example, the input for the algorithm 800 may be received, identified, and/or otherwise processed and/or located. According to some embodiments, the algorithm 800 may comprise data processing, at 812. The data processing may, for example, comprise execution of one or more logical and/or computational procedures, modules, scripts, models, and/or routines that may be stored in a memory device 840 (e.g., similar to the data storage devices 740*a-e*) as a set of instructions or rules 842 and/or that may be defined and/or implemented by one or more electrical, mechanical, and/or physical components, such as logic gates, diodes, transistors, relays, and/or switches (e.g., operable to execute any of the methods/algorithms 400, 500, 800 of FIG. 4, FIG. 5A, FIG. 5B, and/or FIG. 8 herein, and/or portions or combinations thereof).

In some embodiments, execution of the algorithm 800 may comprise a loading of the rules 842 into the memory 840 and/or into an electronic processing system (not shown) and/or an activation of one or more logic gates and/or other electrical and/or mechanical components. The algorithm 800 may operate upon the input in accordance with the rules 842 to achieve a result by defining output, at 818. The algorithm 800 may, for example, generate, produce, define, identify, calculate, and/or otherwise compute output based on an application of the data processing (at 812) utilizing the rules 842 and any or all input receiving at 804. According to some embodiments, the algorithm 800 may comprise providing the output, at 820. One or more output devices (not shown) may be utilized to convey the output (e.g., a result, conclusion, decision, etc.) to one or more other devices and/or entities (not shown), such as one or more users, consumers, customers, potential customers, and/or devices utilized thereby. The output may be displayed via an electronic display screen of a computer, mobile/smart phone, smart watch, etc., and/or may be transmitted as one or more electronic signals to one or more network destination addresses, such as email addresses, URL locations, Media Access Control (MAC) addresses, and/or broadcast radio frequencies.

According to some embodiments, the data processing at 812 may comprise execution of a listing, sequence, matrix, and/or other set of stored steps and/or instructions that utilize the input to define the output. In some embodiments, the listing of steps and/or instruction details may comprise elements that are known to those skilled in the art. The algorithm 800 may partially or completely comprise, for example, instructions and/or steps that are well known, such as steps and/or instructions operable to calculate an area (length times width), volume (length times width times height), distance (difference between two locations), velocity (distance over time), acceleration (velocity over time), and/or any other known mathematical and/or logical (if/then statements) procedures. For any and all known procedures and/or instructions, the discrete details of such instructions are represented by the data processing at 812 and are not listed herein as one of ordinary skill in the art would readily comprehend both what such technological knowledge entails and that the inventor has possession of such knowledge. Instructions that may be included within and/or comprise the data processing at 812 (and/or the algorithm 800) may include, for example, but are not limited to, any known or practicable: (i) communication protocols and/or algorithms, (ii) AI and/or ML data input classification algorithms, (iii) data transmission algorithms, (iv) data encoding algorithms, (v) data decoding algorithms, (vi) logical and/or mathematical data comparison algorithms, and (vii) data searching (e.g., keyword searching) algorithms.

V. Additional Embodiments/Description

In some embodiments, various logical paths may be traversed in evaluating requests in the manner described herein. In some cases the evaluation may be successful (e.g., a request may be identified and/or determined to be valid) while in some cases the evaluation may fail (e.g., the request may be identified and/or determined to not be valid). In some embodiments, various systems, components, methods, and/or articles of manufacture may be utilized to traverse one or more of these logical paths. Some of the possible embodiments are outlined below.

According to some embodiments, an access management system for providing authentication and authorization with respect to access to a computer service operating within a computing environment may comprise: a server comprising a plurality of processing devices; a cache memory in communication with the server; and at least one non-transitory computer-readable memory device in communication with the server, the memory device storing (i) a service, (ii) an access management tool, (iii) a directory, and (iv) instructions that when executed by at least one of the plurality of processing devices, result in: receiving, from a client device of a client and by at least one of the plurality of processing devices, a call to the service, the call comprising data defining (a) an identifier of the client, (b) a password, and (c) an identifier of the service; intercepting, by the access management tool, the call to the service; querying, by the access management tool and utilizing the identifier of the service, the cache memory; identifying, by the access management tool and based on the querying of the cache memory utilizing the identifier of the service, that the cache memory does not contain a stored record of the identifier of the client with respect to the identifier of the service; querying, by the access management tool, after the identifying that the cache memory does not contain the stored record of the identifier of the client with respect to the identifier of the service, and utilizing the identifier of the service, the directory; identifying, by the access management tool and based on the querying of the directory utilizing the identifier of the service, that the directory contains a stored record of the identifier of the service; querying, by the access management tool, after the identifying that the directory contains the stored record of the identifier of the service, and utilizing the identifier of the client, the directory; identifying, by the access management tool and based on the querying of the directory utilizing the identifier of the client, that the directory contains the stored record of the identifier of the client with respect to the identifier of the service; querying, by the access management tool, after the identifying that the directory contains the stored record of the identifier of the client with respect to the identifier of the service, and utilizing the identifier of the client and the password, the directory; identifying, by the access management tool and based on the querying of the directory utilizing the identifier of the client and the password, that the directory does not contain a stored record of the identifier of the client with respect to the password; storing, by the access management tool, and after the identifying that the directory does not contain the stored record of the identifier of the client with respect to the password, the (a) identifier of the client, (b) password, (c) identifier of the service, and (d) an indication of a validation failure, in the cache memory; and/or transmitting, by the access management tool, and after the identifying that the directory does not contain the stored record of the identifier of the client with respect to the password, an indication that the request has failed validation.

In some embodiments, an access management system for providing authentication and authorization with respect to access to a computer service operating within a computing environment may comprise: a server comprising a plurality of processing devices; a cache memory in communication with the server; and at least one non-transitory computer-readable memory device in communication with the server, the memory device storing (i) a service, (ii) an access management tool, (iii) a directory, and (iv) instructions that when executed by at least one of the plurality of processing devices, result in: receiving, from a client device of a client and by at least one of the plurality of processing devices, a call to the service, the call comprising data defining (a) an identifier of the client, (b) a password, and (c) an identifier of the service; intercepting, by the access management tool, the call to the service; querying, by the access management tool and utilizing the identifier of the service, the cache memory; identifying, by the access management tool and based on the querying of the cache memory utilizing the identifier of the service, that the cache memory does not contain a stored record of the identifier of the client with respect to the identifier of the service; querying, by the access management tool, after the identifying that the cache memory does not contain the stored record of the identifier of the client with respect to the identifier of the service, and utilizing the identifier of the service, the directory; identifying, by the access management tool and based on the querying of the directory utilizing the identifier of the service, that the directory contains a stored record of the identifier of the service; querying, by the access management tool, after the identifying that the directory contains the stored record of the identifier of the service, and utilizing the identifier of the client, the directory; identifying, by the access management tool and based on the querying of the directory utilizing the identifier of the client, that the directory contains the stored record of the identifier of the client with respect to the identifier of the service; querying, by the access management tool, after the identifying that the directory contains the stored record of the identifier of the client with respect to the identifier of the service, and utilizing the identifier of the client and the password, the cache memory; identifying, by the access management tool and based on the querying of the cache memory utilizing the identifier of the client and the password, that the cache memory contains a stored record of the identifier of the client with respect to the password; storing, by the access management tool, and after the identifying (i) that the directory contains the stored record of the identifier of the service, (ii) that the directory contains the stored record of the identifier of the client with respect to the identifier of the service, and (iii) that the cache memory contains the stored record of the identifier of the client with respect to the password, the (a) identifier of the client, (b) password, and (c) identifier of the service, in the cache memory; and/or forwarding, by the access management tool, and after the identifying (i) that the directory contains the stored record of the identifier of the service, (ii) that the directory contains the stored record of the identifier of the client with respect to the identifier of the service, and (iii) that the cache memory contains the stored record of the identifier of the client with respect to the password, the call to the service.

According to some embodiments, an access management system for providing authentication and authorization with respect to access to a computer service operating within a computing environment may comprise: a server comprising a plurality of processing devices; a cache memory in communication with the server; and at least one non-transitory computer-readable memory device in communication with the server, the memory device storing (i) a service, (ii) an access management tool, (iii) a directory, and (iv) instructions that when executed by at least one of the plurality of processing devices, result in: receiving, from a client device of a client and by at least one of the plurality of processing devices, a call to the service, the call comprising data defining (a) an identifier of the client, (b) a password, and (c) an identifier of the service; intercepting, by the access management tool, the call to the service; querying, by the access management tool and utilizing the identifier of the service, the cache memory; identifying, by the access management tool and based on the querying of the cache memory utilizing the identifier of the service, that the cache memory does not contain a stored record of the identifier of the client with respect to the identifier of the service; querying, by the access management tool, after the identifying that the cache memory does not contain the stored record of the identifier of the client with respect to the identifier of the service, and utilizing the identifier of the service, the directory; identifying, by the access management tool and based on the querying of the directory utilizing the identifier of the service, that the directory contains a stored record of the identifier of the service; querying, by the access management tool, after the identifying that the directory contains the stored record of the identifier of the service, and utilizing the identifier of the client, the directory; identifying, by the access management tool and based on the querying of the directory utilizing the identifier of the client, that the directory contains the stored record of the identifier of the client with respect to the identifier of the service; querying, by the access management tool, after the identifying that the directory contains the stored record of the identifier of the client with respect to the identifier of the service, and utilizing the identifier of the client and the password, the cache memory; identifying, by the access management tool and based on the querying of the cache memory utilizing the identifier of the client and the password, that the cache memory does not contain a stored record of the identifier of the client with respect to the password; querying, by the access management tool, after the identifying that the cache memory does not contain the stored record of the identifier of the client with respect to the password, and utilizing the identifier of the client and the password, the directory; identifying, by the access management tool and based on the querying of the directory utilizing the identifier of the client and the password, that the directory contains the stored record of the identifier of the client with respect to the password; storing, by the access management tool, and after the identifying (i) that the directory contains the stored record of the identifier of the service, (ii) that the directory contains the stored record of the identifier of the client with respect to the identifier of the service, and (iii) that the directory contains the stored record of the identifier of the client with respect to the password, the (a) identifier of the client, (b) password, and (c) identifier of the service, in the cache memory; and/or forwarding, by the access management tool, and after the identifying (i) that the directory contains the stored record of the identifier of the service, (ii) that the directory contains the stored record of the identifier of the client with respect to the identifier of the service, and (iii) that the directory contains the stored record of the identifier of the client with respect to the password, the call to the service.

In some embodiments, an access management system for providing authentication and authorization with respect to access to a computer service operating within a computing environment may comprise: a server comprising a plurality of processing devices; a cache memory in communication with the server; and at least one non-transitory computer-readable memory device in communication with the server, the memory device storing (i) a service, (ii) an access management tool, (iii) a directory, and (iv) instructions that when executed by at least one of the plurality of processing devices, result in: receiving, from a client device of a client and by at least one of the plurality of processing devices, a call to the service, the call comprising data defining (a) an identifier of the client, (b) a password, and (c) an identifier of the service; intercepting, by the access management tool, the call to the service; querying, by the access management tool and utilizing the identifier of the service, the cache memory; identifying, by the access management tool and based on the querying of the cache memory utilizing the identifier of the service, that the cache memory does not contain a stored record of the identifier of the client with respect to the identifier of the service; querying, by the access management tool, after the identifying that the cache memory does not contain the stored record of the identifier of the client with respect to the identifier of the service, and utilizing the identifier of the service, the directory; identifying, by the access management tool and based on the querying of the directory utilizing the identifier of the service, that the directory contains a stored record of the identifier of the service; querying, by the access management tool, after the identifying that the directory contains the stored record of the identifier of the service, and utilizing the identifier of the client, the directory; identifying, by the access management tool and based on the querying of the directory utilizing the identifier of the client, that the directory contains the stored record of the identifier of the client with respect to the identifier of the service; querying, by the access management tool, after the identifying that the directory contains the stored record of the identifier of the client with respect to the identifier of the service, and utilizing the identifier of the client and the password, the cache memory; identifying, by the access management tool and based on the querying of the cache memory utilizing the identifier of the client and the password, that the cache memory does not contain a stored record of the identifier of the client with respect to the password; querying, by the access management tool, after the identifying that the cache memory does not contain the stored record of the identifier of the client with respect to the password, and utilizing the identifier of the client and the password, the directory; identifying, by the access management tool and based on the querying of the directory utilizing the identifier of the client and the password, that the directory does not contain the stored record of the identifier of the client with respect to the password; storing, by the access management tool, and after the identifying that the directory does not contain the stored record of the identifier of the client with respect to the password, the (a) identifier of the client, (b) password, (c) identifier of the service, and (d) an indication of a validation failure, in the cache memory; and/or transmitting, by the access management tool, and after the identifying that the directory does not contain the stored record of the identifier of the client with respect to the password, an indication that the request has failed validation.

According to some embodiments, an access management system for providing authentication and authorization with respect to access to a computer service operating within a computing environment may comprise: a server comprising a plurality of processing devices; a cache memory in communication with the server; and at least one non-transitory computer-readable memory device in communication with the server, the memory device storing (i) a service, (ii) an access management tool, (iii) a directory, and (iv) instructions that when executed by at least one of the plurality of processing devices, result in: receiving, from a client device of a client and by at least one of the plurality of processing devices, a call to the service, the call comprising data defining (a) an identifier of the client, (b) a password, and (c) an identifier of the service; intercepting, by the access management tool, the call to the service; querying, by the access management tool and utilizing the identifier of the service, the cache memory; identifying, by the access management tool and based on the querying of the cache memory utilizing the identifier of the service, that the cache memory does not contain a stored record of the identifier of the client with respect to the identifier of the service; querying, by the access management tool, after the identifying that the cache memory does not contain the stored record of the identifier of the client with respect to the identifier of the service, and utilizing the identifier of the service, the directory; identifying, by the access management tool and based on the querying of the directory utilizing the identifier of the service, that the directory contains a stored record of the identifier of the service; querying, by the access management tool, after the identifying that the directory contains the stored record of the identifier of the service, and utilizing the identifier of the client, the directory; identifying, by the access management tool and based on the querying of the directory utilizing the identifier of the client, that the directory does not contain the stored record of the identifier of the client with respect to the identifier of the service; storing, by the access management tool, and after the identifying that the directory does not contain the stored record of the identifier of the client with respect to the identifier of the service, the (a) identifier of the client, (b) password, (c) identifier of the service, and (d) an indication of a validation failure, in the cache memory; and/or transmitting, by the access management tool, and after the identifying that the directory does not contain the stored record of the identifier of the client with respect to the identifier of the service, an indication that the request has failed validation.

In some embodiments, an access management system for access management system for providing authentication and authorization with respect to access to a computer service operating within a computing environment may comprise: a server comprising a plurality of processing devices; a cache memory in communication with the server; and at least one non-transitory computer-readable memory device in communication with the server, the memory device storing (i) a service, (ii) an access management tool, (iii) a directory, and (iv) instructions that when executed by at least one of the plurality of processing devices, result in: receiving, from a client device of a client and by at least one of the plurality of processing devices, a call to the service, the call comprising data defining (a) an identifier of the client, (b) a password, and (c) an identifier of the service; intercepting, by the access management tool, the call to the service; querying, by the access management tool and utilizing the identifier of the service, the cache memory; identifying, by the access management tool and based on the querying of the cache memory utilizing the identifier of the service, that the cache memory does not contain a stored record of the identifier of the client with respect to the identifier of the service; querying, by the access management tool, after the identifying that the cache memory does not contain the stored record of the identifier of the client with respect to the identifier of the service, and utilizing the identifier of the service, the directory; identifying, by the access management tool and based on the querying of the directory utilizing the identifier of the service, that the directory does not contain a stored record of the identifier of the service; storing, by the access management tool, and after the identifying that the directory does not contain the stored record of the identifier of the service, the (a) identifier of the client, (b) password, (c) identifier of the service, and (d) an indication of a validation failure, in the cache memory; and/or transmitting, by the access management tool, and after the identifying that the directory does not contain the stored record of the identifier of the service, an indication that the request has failed validation.

According to some embodiments, an access management system for providing authentication and authorization with respect to access to a computer service operating within a computing environment may comprise: a server comprising a plurality of processing devices; a cache memory in communication with the server; and at least one non-transitory computer-readable memory device in communication with the server, the memory device storing (i) a service, (ii) an access management tool, (iii) a directory, and (iv) instructions that when executed by at least one of the plurality of processing devices, result in: receiving, from a client device of a client and by at least one of the plurality of processing devices, a call to the service, the call comprising data defining (a) an identifier of the client, (b) a password, and (c) an identifier of the service; intercepting, by the access management tool, the call to the service; querying, by the access management tool and utilizing the identifier of the service, the cache memory; identifying, by the access management tool and based on the querying of the cache memory utilizing the identifier of the service, that the cache memory contains a stored record of the identifier of the client with respect to the identifier of the service; identifying, by the access management tool and based on the querying of the cache memory utilizing the identifier of the client, that the stored record of the identifier of the client with respect to the identifier of the service indicates an authorization for the client to access the service; querying, by the access management tool, after the identifying that the stored record of the identifier of the client with respect to the identifier of the service indicates an authorization for the client to access the service, and utilizing the identifier of the client and the password, the cache memory; identifying, by the access management tool and based on the querying of the cache memory utilizing the identifier of the client and the password, that the cache memory contains a stored record of the identifier of the client with respect to the password; storing, by the access management tool, and after the identifying (i) that the cache memory contains the stored record of the identifier of the client with respect to the identifier of the service, (ii) that the stored record of the identifier of the client with respect to the identifier of the service indicates an authorization for the client to access the service, and (iii) that the cache memory contains the stored record of the identifier of the client with respect to the password, the (a) identifier of the client, (b) password, and (c) identifier of the service, in the cache memory; and/or forwarding, by the access management tool, and after the identifying (i) that the cache memory contains the stored record of the identifier of the client with respect to the identifier of the service, and (ii) that the cache memory contains the stored record of the identifier of the client with respect to the password, the call to the service.

In some embodiments, an access management system for providing authentication and authorization with respect to access to a computer service operating within a computing environment may comprise: a server comprising a plurality of processing devices; a cache memory in communication with the server; and at least one non-transitory computer-readable memory device in communication with the server, the memory device storing (i) a service, (ii) an access management tool, (iii) a directory, and (iv) instructions that when executed by at least one of the plurality of processing devices, result in: receiving, from a client device of a client and by at least one of the plurality of processing devices, a call to the service, the call comprising data defining (a) an identifier of the client, (b) a password, and (c) an identifier of the service; intercepting, by the access management tool, the call to the service; querying, by the access management tool and utilizing the identifier of the service, the cache memory; identifying, by the access management tool and based on the querying of the cache memory utilizing the identifier of the service, that the cache memory contains a stored record of the identifier of the client with respect to the identifier of the service; identifying, by the access management tool and based on the querying of the cache memory utilizing the identifier of the client, that the stored record of the identifier of the client with respect to the identifier of the service indicates an authorization for the client to access the service; querying, by the access management tool, after the identifying that the stored record of the identifier of the client with respect to the identifier of the service indicates an authorization for the client to access the service, and utilizing the identifier of the client and the password, the cache memory; identifying, by the access management tool and based on the querying of the cache memory utilizing the identifier of the client and the password, that the cache memory does not contain a stored record of the identifier of the client with respect to the password; querying, by the access management tool, after the identifying that the cache memory does not contain a stored record of the identifier of the client with respect to the password, and utilizing the identifier of the client and the password, the directory; identifying, by the access management tool and based on the querying of the directory utilizing the identifier of the client and the password, that the directory contains a stored record of the identifier of the client with respect to the password; storing, by the access management tool, and after the identifying (i) that the cache memory contains the stored record of the identifier of the client with respect to the identifier of the service, (ii) that the stored record of the identifier of the client with respect to the identifier of the service indicates an authorization for the client to access the service, and (iii) that the directory contains the stored record of the identifier of the client with respect to the password, the (a) identifier of the client, (b) password, and (c) identifier of the service, in the cache memory; and/or forwarding, by the access management tool, and after the identifying (i) that the cache memory contains the stored record of the identifier of the client with respect to the identifier of the service, and (ii) that the directory contains the stored record of the identifier of the client with respect to the password, the call to the service.

According to some embodiments, an access management system for providing authentication and authorization with respect to access to a computer service operating within a computing environment may comprise: a server comprising a plurality of processing devices; a cache memory in communication with the server; and at least one non-transitory computer-readable memory device in communication with the server, the memory device storing (i) a service, (ii) an access management tool, (iii) a directory, and (iv) instructions that when executed by at least one of the plurality of processing devices, result in: receiving, from a client device of a client and by at least one of the plurality of processing devices, a call to the service, the call comprising data defining (a) an identifier of the client, (b) a password, and (c) an identifier of the service; intercepting, by the access management tool, the call to the service; querying, by the access management tool and utilizing the identifier of the service, the cache memory; identifying, by the access management tool and based on the querying of the cache memory utilizing the identifier of the service, that the cache memory contains a stored record of the identifier of the service, that the cache memory contains a stored record of the identifier of the client with respect to the identifier of the service; identifying, by the access management tool and based on the querying of the cache memory utilizing the identifier of the client, that the stored record of the identifier of the client with respect to the identifier of the service indicates an authorization for the client to access the service; querying, by the access management tool, after the identifying that the stored record of the identifier of the client with respect to the identifier of the service indicates an authorization for the client to access the service, and utilizing the identifier of the client and the password, the cache memory; identifying, by the access management tool and based on the querying of the cache memory utilizing the identifier of the client and the password, that the cache memory does not contain a stored record of the identifier of the client with respect to the password; querying, by the access management tool, after the identifying that the cache memory does not contain a stored record of the identifier of the client with respect to the password, and utilizing the identifier of the client and the password, the directory; identifying, by the access management tool and based on the querying of the directory utilizing the identifier of the client and the password, that the directory does not contain a stored record of the identifier of the client with respect to the password; storing, by the access management tool, and after the identifying that the directory does not contain the stored record of the identifier of the client with respect to the password, the (a) identifier of the client, (b) password, (c) identifier of the service, and (d) an indication of a validation failure, in the cache memory; and/or transmitting, by the access management tool, and after the identifying that the directory does not contain the stored record of the identifier of the client with respect to the password, an indication that the request has failed validation.

In some embodiments, an access management system for providing authentication and authorization with respect to access to a computer service operating within a computing environment may comprise: a server comprising a plurality of processing devices; a cache memory in communication with the server; and at least one non-transitory computer-readable memory device in communication with the server, the memory device storing (i) a service, (ii) an access management tool, (iii) a directory, and (iv) instructions that when executed by at least one of the plurality of processing devices, result in: receiving, from a client device of a client and by at least one of the plurality of processing devices, a call to the service, the call comprising data defining (a) an identifier of the client, (b) a password, and (c) an identifier of the service; intercepting, by the access management tool, the call to the service; querying, by the access management tool and utilizing the identifier of the service, the cache memory; identifying, by the access management tool and based on the querying of the cache memory utilizing the identifier of the service, that the cache memory contains a stored record of the identifier of the client with respect to the identifier of the service; querying, by the access management tool, after the identifying that the cache memory contains the stored record of the identifier of the service, and utilizing the identifier of the client, the cache memory; identifying, by the access management tool and based on the querying of the cache memory utilizing the identifier of the client, that the cache memory does not contain a stored record of the identifier of the client with respect to the identifier of the service; querying, by the access management tool, after the identifying that the cache memory does not contain a stored record of the identifier of the client with respect to the identifier of the service, and utilizing the identifier of the client, the directory; identifying, by the access management tool and based on the querying of the directory utilizing the identifier of the client, that the directory contains a stored record of the identifier of the client with respect to the identifier of the service; querying, by the access management tool, after the identifying that the directory contains the stored record of the identifier of the client with respect to the identifier of the service, and utilizing the identifier of the client and the password, the directory; identifying, by the access management tool and based on the querying of the directory utilizing the identifier of the client and the password, that the directory does not contain the stored record of the identifier of the client with respect to the password; storing, by the access management tool, and after the identifying that the directory does not contain the stored record of the identifier of the client with respect to the password, the (a) identifier of the client, (b) password, (c) identifier of the service, and (d) an indication of a validation failure, in the cache memory; and/or transmitting, by the access management tool, and after the identifying that the directory does not contain the stored record of the identifier of the client with respect to the password, an indication that the request has failed validation.

According to some embodiments, an access management system for providing authentication and authorization with respect to access to a computer service operating within a computing environment may comprise: a server comprising a plurality of processing devices; a cache memory in communication with the server; and at least one non-transitory computer-readable memory device in communication with the server, the memory device storing (i) a service, (ii) an access management tool, (iii) a directory, and (iv) instructions that when executed by at least one of the plurality of processing devices, result in: receiving, from a client device of a client and by at least one of the plurality of processing devices, a call to the service, the call comprising data defining (a) an identifier of the client, (b) a password, and (c) an identifier of the service; intercepting, by the access management tool, the call to the service; querying, by the access management tool and utilizing the identifier of the service, the cache memory; identifying, by the access management tool and based on the querying of the cache memory utilizing the identifier of the service, that the cache memory contains a stored record of the identifier of the client with respect to the identifier of the service; querying, by the access management tool, after the identifying that the cache memory contains the stored record of the identifier of the service, and utilizing the identifier of the client, the cache memory; identifying, by the access management tool and based on the querying of the cache memory utilizing the identifier of the client, that the cache memory does not contain a stored record of the identifier of the client with respect to the identifier of the service; querying, by the access management tool, after the identifying that the cache memory does not contain a stored record of the identifier of the client with respect to the identifier of the service, and utilizing the identifier of the client, the directory; identifying, by the access management tool and based on the querying of the directory utilizing the identifier of the client, that the directory contains a stored record of the identifier of the client with respect to the identifier of the service; querying, by the access management tool, after the identifying that the directory contains the stored record of the identifier of the client with respect to the identifier of the service, and utilizing the identifier of the client and the password, the cache memory; identifying, by the access management tool and based on the querying of the cache memory utilizing the identifier of the client and the password, that the cache memory does not contain a stored record of the identifier of the client with respect to the password; querying, by the access management tool, after the identifying that the cache memory does not contain a stored record of the identifier of the client with respect to the password, and utilizing the identifier of the client and the password, the directory; identifying, by the access management tool and based on the querying of the directory utilizing the identifier of the client and the password, that the directory contains the stored record of the identifier of the client with respect to the password; storing, by the access management tool, and after the identifying (i) that the cache memory contains the stored record of the identifier of the service, (ii) that the directory contains the stored record of the identifier of the client with respect to the identifier of the service, and (iii) that the directory contains the stored record of the identifier of the client with respect to the password, the (a) identifier of the client, (b) password, and (c) identifier of the service, in the cache memory; and/or forwarding, by the access management tool, and after the identifying (i) that the cache memory contains the stored record of the identifier of the service, (ii) that the directory contains the stored record of the identifier of the client with respect to the identifier of the service, and (iii) that the directory contains the stored record of the identifier of the client with respect to the password, the call to the service.

In some embodiments, an access management system for providing authentication and authorization with respect to access to a computer service operating within a computing environment may comprise: a server comprising a plurality of processing devices; a cache memory in communication with the server; and at least one non-transitory computer-readable memory device in communication with the server, the memory device storing (i) a service, (ii) an access management tool, (iii) a directory, and (iv) instructions that when executed by at least one of the plurality of processing devices, result in: receiving, from a client device of a client and by at least one of the plurality of processing devices, a call to the service, the call comprising data defining (a) an identifier of the client, (b) a password, and (c) an identifier of the service; intercepting, by the access management tool, the call to the service; querying, by the access management tool and utilizing the identifier of the service, the cache memory; identifying, by the access management tool and based on the querying of the cache memory utilizing the identifier of the service, that the cache memory contains a stored record of the identifier of the client with respect to the identifier of the service; querying, by the access management tool, after the identifying that the cache memory contains the stored record of the identifier of the service, and utilizing the identifier of the client, the cache memory; identifying, by the access management tool and based on the querying of the cache memory utilizing the identifier of the client, that the cache memory does not contain a stored record of the identifier of the client with respect to the identifier of the service; querying, by the access management tool, after the identifying that the cache memory does not contain a stored record of the identifier of the client with respect to the identifier of the service, and utilizing the identifier of the client, the directory; identifying, by the access management tool and based on the querying of the directory utilizing the identifier of the client, that the directory contains a stored record of the identifier of the client with respect to the identifier of the service; querying, by the access management tool, after the identifying that the directory contains the stored record of the identifier of the client with respect to the identifier of the service, and utilizing the identifier of the client and the password, the cache memory; identifying, by the access management tool and based on the querying of the cache memory utilizing the identifier of the client and the password, that the cache memory does not contain a stored record of the identifier of the client with respect to the password; querying, by the access management tool, after the identifying that the cache memory does not contain a stored record of the identifier of the client with respect to the password, and utilizing the identifier of the client and the password, the directory; identifying, by the access management tool and based on the querying of the directory utilizing the identifier of the client and the password, that the directory does not contain the stored record of the identifier of the client with respect to the password; storing, by the access management tool, and after the identifying that the directory does not contain the stored record of the identifier of the client with respect to the password, the (a) identifier of the client, (b) password, (c) identifier of the service, and (d) an indication of a validation failure, in the cache memory; and/or transmitting, by the access management tool, and after the identifying that the directory does not contain the stored record of the identifier of the client with respect to the password, an indication that the request has failed validation.

According to some embodiments, an access management system for providing authentication and authorization with respect to access to a computer service operating within a computing environment may comprise: a server comprising a plurality of processing devices; a cache memory in communication with the server; and at least one non-transitory computer-readable memory device in communication with the server, the memory device storing (i) a service, (ii) an access management tool, (iii) a directory, and (iv) instructions that when executed by at least one of the plurality of processing devices, result in: receiving, from a client device of a client and by at least one of the plurality of processing devices, a call to the service, the call comprising data defining (a) an identifier of the client, (b) a password, and (c) an identifier of the service; intercepting, by the access management tool, the call to the service; querying, by the access management tool and utilizing the identifier of the service, the cache memory; identifying, by the access management tool and based on the querying of the cache memory utilizing the identifier of the service, that the cache memory contains a stored record of the identifier of the client with respect to the identifier of the service; querying, by the access management tool, after the identifying that the cache memory contains the stored record of the identifier of the service, and utilizing the identifier of the client, the cache memory; identifying, by the access management tool and based on the querying of the cache memory utilizing the identifier of the client, that the cache memory does not contain a stored record of the identifier of the client with respect to the identifier of the service; querying, by the access management tool, after the identifying that the cache memory does not contain a stored record of the identifier of the client with respect to the identifier of the service, and utilizing the identifier of the client, the directory; identifying, by the access management tool and based on the querying of the directory utilizing the identifier of the client, that the directory does not contain the stored record of the identifier of the client with respect to the identifier of the service; storing, by the access management tool, and after the identifying that the directory does not contain the stored record of the identifier of the client with respect to the identifier of the service, the (a) identifier of the client, (b) password, (c) identifier of the service, and (d) an indication of a validation failure, in the cache memory; and/or transmitting, by the access management tool, and after the identifying that the directory does not contain the stored record of the identifier of the client with respect to the identifier of the service, an indication that the request has failed validation.

In some embodiments, an access management system for providing authentication and authorization with respect to access to a computer service operating within a computing environment may comprise: a server comprising a plurality of processing devices; a cache memory in communication with the server; and at least one non-transitory computer-readable memory device in communication with the server, the memory device storing (i) a service, (ii) an access management tool, (iii) a directory, and (iv) instructions that when executed by at least one of the plurality of processing devices, result in: receiving, from a client device of a client and by at least one of the plurality of processing devices, a call to the service, the call comprising data defining (a) an identifier of the client, (b) a password, and (c) an identifier of the service; intercepting, by the access management tool, the call to the service; querying, by the access management tool and utilizing the identifier of the service, the cache memory; identifying, by the access management tool and based on the querying of the cache memory utilizing the identifier of the service, that the cache memory contains a stored record of the identifier of the client with respect to the identifier of the service; querying, by the access management tool, after the identifying that the cache memory contains the stored record of the identifier of the service, and utilizing the identifier of the client, the cache memory; identifying, by the access management tool and based on the querying of the cache memory utilizing the identifier of the client, that the cache memory does not contain a stored record of the identifier of the client with respect to the identifier of the service; querying, by the access management tool, after the identifying that the cache memory does not contain a stored record of the identifier of the client with respect to the identifier of the service, and utilizing the identifier of the client, the directory; identifying, by the access management tool and based on the querying of the directory utilizing the identifier of the client, that the directory contains a stored record of the identifier of the client with respect to the identifier of the service; querying, by the access management tool, after the identifying that the directory contains the stored record of the identifier of the client with respect to the identifier of the service, and utilizing the identifier of the client and the password, the directory; identifying, by the access management tool and based on the querying of the directory utilizing the identifier of the client and the password, that the directory contains the stored record of the identifier of the client with respect to the password; storing, by the access management tool, and after the identifying (i) that the cache memory contains the stored record of the identifier of the service, (ii) that the directory contains the stored record of the identifier of the client with respect to the identifier of the service, and (iii) that the directory contains the stored record of the identifier of the client with respect to the password, the (a) identifier of the client, (b) password, and (c) identifier of the service, in the cache memory; and/or forwarding, by the access management tool, and after the identifying (i) that the cache memory contains the stored record of the identifier of the service, (ii) that the directory contains the stored record of the identifier of the client with respect to the identifier of the service, and (iii) that the directory contains the stored record of the identifier of the client with respect to the password, the call to the service.

According to some embodiments, an access management system for providing authentication and authorization with respect to access to a computer service operating within a computing environment may comprise: a server comprising a plurality of processing devices; a cache memory in communication with the server; and at least one non-transitory computer-readable memory device in communication with the server, the memory device storing (i) a service, (ii) an access management tool, (iii) a directory, and (iv) instructions that when executed by at least one of the plurality of processing devices, result in: receiving, from a client device of a client and by at least one of the plurality of processing devices, a call to the service, the call comprising data defining (a) an identifier of the client, (b) a password, and (c) an identifier of the service; intercepting, by the access management tool, the call to the service; querying, by the access management tool and utilizing the identifier of the service, the cache memory; identifying, by the access management tool and based on the querying of the cache memory utilizing the identifier of the service, that the cache memory contains a stored record of the identifier of the client with respect to the identifier of the service; querying, by the access management tool, after the identifying that the cache memory contains the stored record of the identifier of the service, and utilizing the identifier of the client, the cache memory; identifying, by the access management tool and based on the querying of the cache memory utilizing the identifier of the client, that the cache memory does not contain a stored record of the identifier of the client with respect to the identifier of the service; querying, by the access management tool, after the identifying that the cache memory does not contain a stored record of the identifier of the client with respect to the identifier of the service, and utilizing the identifier of the client, the directory; identifying, by the access management tool and based on the querying of the directory utilizing the identifier of the client, that the directory contains a stored record of the identifier of the client with respect to the identifier of the service; querying, by the access management tool, after the identifying that the directory contains the stored record of the identifier of the client with respect to the identifier of the service, and utilizing the identifier of the client and the password, the cache memory; identifying, by the access management tool and based on the querying of the cache memory utilizing the identifier of the client and the password, that the cache memory contains the stored record of the identifier of the client with respect to the password; storing, by the access management tool, and after the identifying (i) that the cache memory contains the stored record of the identifier of the service, (ii) that the directory contains the stored record of the identifier of the client with respect to the identifier of the service, and (iii) that the cache memory contains the stored record of the identifier of the client with respect to the password, the (a) identifier of the client, (b) password, and (c) identifier of the service, in the cache memory; and/or forwarding, by the access management tool, and after the identifying (i) that the cache memory contains the stored record of the identifier of the service, (ii) that the directory contains the stored record of the identifier of the client with respect to the identifier of the service, and (iii) that the cache memory contains the stored record of the identifier of the client with respect to the password, the call to the service.

VI. Rules of Interpretation

Throughout the description herein and unless otherwise specified, the following terms may include and/or encompass the example meanings provided. These terms and illustrative example meanings are provided to clarify the language selected to describe embodiments both in the specification and in the appended claims, and accordingly, are not intended to be generally limiting. While not generally limiting and while not limiting for all described embodiments, in some embodiments, the terms are specifically limited to the example definitions and/or examples provided. Other terms are defined throughout the present description.

Some embodiments described herein are associated with a "user device", "source device", "target device", or a "network device". As used herein, the terms "user device", "source device", "target device", and "network device" may be used interchangeably and may generally refer to any device that can communicate via a network. Examples of user or network devices include a PC, a workstation, a server, a printer, a scanner, a facsimile machine, a copier, a Personal Digital Assistant (PDA), a storage device (e.g., a disk drive), a hub, a router, a switch, and a modem, a video game console, or a wireless phone. User and network devices may comprise one or more communication or network components. As used herein, a "user" may generally refer to any individual and/or entity that operates a user device. Users may comprise, for example, customers, consumers, product underwriters, product distributors, customer service representatives, agents, brokers, etc.

As used herein, the term "network component" may refer to a user or network device, or a component, piece, portion, or combination of user or network devices. Examples of network components may include a Static Random Access Memory (SRAM) device or module, a network processor, and a network communication path, connection, port, or cable.

In addition, some embodiments are associated with a "network" or a "communication network". As used herein, the terms "network" and "communication network" may be used interchangeably and may refer to any object, entity, component, device, and/or any combination thereof that permits, facilitates, and/or otherwise contributes to or is associated with the transmission of messages, packets, signals, and/or other forms of information between and/or within one or more network devices. Networks may be or include a plurality of interconnected network devices. In some embodiments, networks may be hard-wired, wireless, virtual, neural, and/or any other configuration of type that is or becomes known. Communication networks may include, for example, one or more networks configured to operate in accordance with the Fast Ethernet LAN transmission standard 802.3-2002® published by the Institute of Electrical and Electronics Engineers (IEEE). In some embodiments, a network may include one or more wired and/or wireless networks operated in accordance with any communication standard or protocol that is or becomes known or practicable.

As used herein, the terms "information" and "data" may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard as defined by "Internet Protocol Version 6 (IPv6) Specification" RFC 1883, published by the Internet Engineering Task Force (IETF), Network Working Group, S. Deering et al. (December 1995). Information may, according to some embodiments, be compressed, encoded, encrypted, and/or otherwise packaged or manipulated in accordance with any method that is or becomes known or practicable.

In addition, some embodiments described herein are associated with an "indication". As used herein, the term "indication" may be used to refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

Numerous embodiments are described in this patent application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

"Determining" something can be performed in a variety of manners and therefore the term "determining" (and like terms) includes calculating, computing, deriving, looking up (e.g., in a table, database or data structure), ascertaining and the like.

It will be readily apparent that the various methods and algorithms described herein may be implemented by, e.g., appropriately and/or specially-programmed computers and/or computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software.

A "processor" generally means any one or more microprocessors, CPU devices, computing devices, microcontrollers, digital signal processors, or like devices, as further described herein.

The term "computer-readable medium" refers to any medium that participates in providing data (e.g., instructions or other information) that may be read by a computer, a processor or a like device. Such a medium may take many forms, including but not limited to, non-volatile media, volatile media, and transmission media. Non-volatile media include, for example, optical or magnetic disks and other persistent memory. Volatile media include DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during RF and IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave, or any other medium from which a computer can read.

The term "computer-readable memory" may generally refer to a subset and/or class of computer-readable medium that does not include transmission media, such as waveforms, carrier waves, electromagnetic emissions, etc. Computer-readable memory may typically include physical media upon which data (e.g., instructions or other information) are stored, such as optical or magnetic disks and other persistent memory, DRAM, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, computer hard drives, backup tapes, Universal Serial Bus (USB) memory devices, and the like.

Various forms of computer readable media may be involved in carrying data, including sequences of instructions, to a processor. For example, sequences of instruction (i) may be delivered from RAM to a processor, (ii) may be carried over a wireless transmission medium, and/or (iii) may be formatted according to numerous formats, standards or protocols, such as Bluetooth™, TDMA, CDMA, 3G.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device that accesses data in such a database.

The present invention can be configured to work in a network environment including a computer that is in communication, via a communications network, with one or more devices. The computer may communicate with the devices directly or indirectly, via a wired or wireless medium, such as the Internet, LAN, WAN or Ethernet, Token Ring, or via any appropriate communications means or combination of communications means. Each of the devices may comprise computers, such as those based on the Intel® Pentium® or Centrino™ processor, that are adapted to communicate with the computer. Any number and type of machines may be in communication with the computer.

The indefinite articles "a" and "an," as used herein in the specification and in the claims, unless clearly indicated to the contrary, should be understood to mean "at least one." This rule applies even within the body of a claim where a first instance of an element utilizes "a" or "an" and a second or subsequent instance of the element necessarily utilizes (e.g., for purposes of proper grammar and required antecedent basis) the definite article "the" to refer to the element. The use of the definite article "the" does not limit the element to a single object merely because it is utilized to refer back to a previous mention of the element. The original reference to the element controls with respect to the plurality (or lack thereof) of the element.

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified, unless clearly indicated to the contrary.

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application. Applicant intends to file additional applications to pursue patents for subject matter that has been disclosed and enabled but not claimed in the present application.

It will be understood that various modifications can be made to the embodiments of the present disclosure herein without departing from the scope thereof. Therefore, the above description should not be construed as limiting the disclosure, but merely as embodiments thereof. Those skilled in the art will envision other modifications within the scope of the invention as defined by the claims appended hereto.

What is claimed is:

1. An access management system for providing pre-authentication and authorization with respect to access to a computer service operating within a computing environment, thereby reducing a number of queries sent to an Active Directory (AD), comprising:

a server comprising a plurality of processing devices;

a cache memory in communication with the server; and at least one non-transitory computer-readable memory device in communication with the server, the memory device storing (i) a second service, (ii) an access management tool, (iii) a directory, and (iv) instructions that when executed by at least one of the plurality of processing devices, result in:

receiving, from a client device of a client comprising a first service and by at least one of the plurality of processing devices, a call to the second service, the call comprising data defining (a) an identifier of the first service, (b) a password, and (c) an identifier of the second service;

intercepting, by the access management tool, the call to the second service;

querying, by the access management tool and utilizing the identifier of the second service, the cache memory;

identifying, by the access management tool and based on the querying of the cache memory utilizing the identifier of the second service, that the cache memory does not contain a stored record of the identifier of the first service with respect to the identifier of the second service;

querying, by the access management tool, after the identifying that the cache memory does not contain the stored record of the identifier of the first service with respect to the identifier of the second service, and utilizing the identifier of the second service, the directory;

identifying, by the access management tool and based on the querying of the directory utilizing the identifier of the second service, that the directory contains a stored record of the identifier of the second service;

querying, by the access management tool, after the identifying that the directory contains the stored record of the identifier of the second service, and utilizing the identifier of the first service, the directory;

identifying, by the access management tool and based on the querying of the directory utilizing the identifier of the first service, that the directory contains the stored record of the identifier of the first service with respect to the identifier of the second service;

querying, by the access management tool, after the identifying that the directory contains the stored record of the identifier of the first service with respect to the identifier of the second service, and utilizing the identifier of the first service and the password, the directory;

identifying, by the access management tool and based on the querying of the directory utilizing the identifier of the first service and the password, that the directory contains a stored record of the identifier of the first service with respect to the password;

storing, by the access management tool, and after the identifying (i) that the directory contains the stored record of the identifier of the second service, (ii) that the directory contains the stored record of the identifier of the first service with respect to the identifier of the second service, and (iii) that the directory contains the stored record of the identifier of the first service with respect to the password, the (a) identifier of the first service, (b) password, and (c) identifier of the second service, in the cache memory; and forwarding, by the access management tool, and after the identifying (i) that the directory contains the stored record of the identifier of the second service, (ii) that the directory contains the stored record of the identifier of the first service with respect to the identifier of the second service, and (iii) that the directory contains the stored record of the identifier of the first service with respect to the password, the call to the service.

2. The access management system of claim 1, wherein the first service comprises a first service in the computing environment and the second service that is called comprises a second service in the computing environment.

3. The access management system of claim 2, wherein the second service comprises an application container.

4. The access management system of claim 1, wherein each of the access management tool and the second service are encapsulated in a single pod.

5. The access management system of claim 4, wherein the access management tool is configured to intercept all communications incoming to the single pod.

6. The access management system of claim 1, further comprising:

a router service.

7. The access management system of claim 6, wherein the intercepting of the call to the second service by the access management tool, comprises:

identifying, by the router service, the call to the second service;

routing the call to the second service, by the router service, to the access management tool; and receiving, by the access management tool, the call to the second service.

8. The access management system of claim 1, wherein the call to the second service comprises a message packet and a message header and where the data defining the (a) identifier of the first service and (b) password are defined by the message header.

9. The access management system of claim 1, wherein the directory comprises a Lightweight Directory Service (LDS).

10. The access management system of claim 1, wherein the instructions, when executed by the at least one of the plurality of processing devices, further result in:

identifying, by the access management tool, at least one of a time and a data capacity threshold;

comparing, by the access management tool, the identified threshold to at least one of a current time and a current data usage parameter value;

identifying, by the access management tool, that the identified threshold is exceeded; and clearing, in response to the identifying that the identified threshold is exceeded, the cache memory.

11. An access management method for providing pre-authentication and authorization with respect to access to a computer service operating within a computing environment, thereby reducing a number of queries sent to an Active Directory (AD), comprising:

receiving, from a client device of a client comprising a first service and by at least one of a plurality of processing devices of a server, a call to a second service defined by code stored in at least one non-transitory computer-readable memory device in communication with the server, the call comprising data defining (a) an identifier of the first service, (b) a password, and (c) an identifier of the second service;

intercepting, by an access management tool stored in the at least one non-transitory computer-readable memory device, the call to the second service;

querying, by the access management tool and utilizing the identifier of the second service, a cache memory in communication with the server;

identifying, by the access management tool and based on the querying of the cache memory utilizing the identifier of the second service, that the cache memory does not contain a stored record of the identifier of the first service with respect to the identifier of the second service;

querying, by the access management tool, after the identifying that the cache memory does not contain the stored record of the identifier of the first service with respect to the identifier of the second service, and utilizing the identifier of the second service, a directory stored in the at least one non-transitory computer-readable memory device;

identifying, by the access management tool and based on the querying of the directory utilizing the identifier of the second service, that the directory contains a stored record of the identifier of the second service;

querying, by the access management tool, after the identifying that the directory contains the stored record of the identifier of the second service, and utilizing the identifier of the first service, the directory;

identifying, by the access management tool and based on the querying of the directory utilizing the identifier of the first service, that the directory contains a stored record of the identifier of the first service with respect to the identifier of the second service;

querying, by the access management tool, after the identifying that the directory contains the stored record of the identifier of the first service with respect to the identifier of the second service, and utilizing the identifier of the first service and the password, the directory;

identifying, by the access management tool and based on the querying of the directory utilizing the identifier of the first service and the password, that the directory contains a stored record of the identifier of the first service with respect to the password;

storing, by the access management tool, and after the identifying (i) that the directory contains the stored record of the identifier of the second service, (ii) that the directory contains the stored record of the identifier of the first service with respect to the identifier of the second service, and (iii) that the directory contains the stored record of the identifier of the first service with respect to the password, the (a) identifier of the first service, (b) password, and (c) identifier of the second service, in the cache memory; and forwarding, by the access management tool, and after the identifying (i) that the directory contains the stored record of the identifier of the second service, (ii) that the directory contains the stored record of the identifier of the first service with respect to the identifier of the second service, and (iii) that the directory contains the stored record of the identifier of the first service with respect to the password, the call to the second service.

12. The access management method of claim 11, wherein the first service comprises a first service in the computing environment and the second service that is called comprises a second service in the computing environment.

13. The access management method of claim 12, wherein the second service comprises an application container.

14. The access management method of claim 11, wherein each of the access management tool and the second service are encapsulated in a single pod.

15. The access management method of claim 14, wherein the access management tool is configured to intercept all communications incoming to the single pod.

16. The access management method of claim 11, wherein the call to the second service comprises a message packet and a message header and where the data defining the (a) identifier of the first service and (b) password are defined by the message header.

17. The access management method of claim 11, wherein the intercepting of the call to the second service by the access management tool, comprises:

identifying, by a router service, the call to the second service;

routing the call to the second service, by the router service, to the access management tool; and receiving, by the access management tool, the call to the second service.

18. The access management method of claim 11, wherein the directory comprises a Lightweight Directory Service (LDS).

19. The access management method of claim 11, further comprising:

identifying, by the access management tool, at least one of a time and a data capacity threshold;

comparing, by the access management tool, the identified threshold to at least one of a current time and a current data usage parameter value;

identifying, by the access management tool, that the identified threshold is exceeded; and clearing, in response to the identifying that the identified threshold is exceeded, the cache memory.

\* \* \* \* \*